US012134270B2

(12) United States Patent
Matsuo

(10) Patent No.: US 12,134,270 B2
(45) Date of Patent: Nov. 5, 2024

(54) MAINTENANCE METHOD OF LIQUID DISCHARGING APPARATUS

(71) Applicant: Seiko Epson Corporation, Tokyo (JP)

(72) Inventor: Kenichiro Matsuo, Matsumoto (JP)

(73) Assignee: SEIKO EPSON CORPORATION (JP)

(*) Notice: Subject to any disclaimer, the term of this patent is extended or adjusted under 35 U.S.C. 154(b) by 125 days.

(21) Appl. No.: 17/582,323

(22) Filed: Jan. 24, 2022

(65) Prior Publication Data

US 2022/0234351 A1 Jul. 28, 2022

(30) Foreign Application Priority Data

Jan. 25, 2021 (JP) ................................. 2021-009357

(51) Int. Cl.
*B41J 2/045* (2006.01)
*B41J 2/165* (2006.01)

(52) U.S. Cl.
CPC ....... *B41J 2/04571* (2013.01); *B41J 2/04581* (2013.01); *B41J 2/1652* (2013.01)

(58) Field of Classification Search
CPC .................................................... B41J 2/16517
See application file for complete search history.

(56) References Cited

U.S. PATENT DOCUMENTS 6,561,622 B1 5/2003 Suzuki et al.
2002/0063762 A1* 5/2002 Jozef Haan .......... B41J 2/17546 347/88
2008/0186351 A1 8/2008 Takahashi
2012/0249638 A1* 10/2012 Takano .................. B41J 2/0454 347/10
2014/0168299 A1* 6/2014 Kamibayashi ....... B41J 2/04556 347/10
2015/0352841 A1* 12/2015 Horie ..................... B41J 2/0451 347/10
2018/0272693 A1 9/2018 Hayashi

FOREIGN PATENT DOCUMENTS

JP 2000-233518 A 8/2000
JP 2005047058 A * 2/2005 .......... B41J 2/17509
JP 2008-188942 A 8/2008
JP 2012-206289 A 10/2012
JP 2018-187791 A 11/2018

* cited by examiner

*Primary Examiner* — Shelby L Fidler
(74) *Attorney, Agent, or Firm* — Harness, Dickey & Pierce, P.L.C.

(57) ABSTRACT

A maintenance method for a liquid discharging apparatus including a discharging portion that discharges liquid, the maintenance method includes acquiring first viscosity information related to viscosity of the liquid inside the discharging portion, discharging a first amount of the liquid from the discharging portion, acquiring second viscosity information related to viscosity of the liquid inside the discharging portion, and discharging a second amount of the liquid based on the first viscosity information and the second viscosity information, from the discharging portion.

17 Claims, 21 Drawing Sheets

FIG. 9

| Sd[m] | DESIGNATION CONTENT OF Sd[m] | SLa[m] | | SLb[m] | | | SLs[m] | | |
|---|---|---|---|---|---|---|---|---|---|
| | | Tu1 | Tu2 | TSS1 | TSS2 | TSS3 | TSS1 | TSS2 | TSS3 |
| (1, 1, 0) | LARGE DOT | H | H | L | L | L | L | L | L |
| (1, 0, 0) | MEDIUM DOT | H | L | L | L | L | L | L | L |
| (0, 1, 0) | SMALL DOT | L | H | L | L | L | L | L | L |
| (0, 0, 0) | NO RECORDING | L | L | L | L | L | L | L | L |
| (1, 1, 1) | DETERMINATION TARGET | L | L | H | L | H | L | H | L |

FIG. 10

| Info-S | Info-T | Stt |
|---|---|---|
| 1 | $NTc < Tth1$ | 2 : DISCHARGE ABNORMALITY DUE TO AIR BUBBLES |
| | $Tth1 \leq NTc \leq Tth2$ | 1 : NORMAL |
| | $Tth2 < NTc \leq Tth3$ | 3 : DISCHARGE ABNORMALITY DUE TO FOREIGN MATTER |
| | $Tth3 < NTc$ | 4 : DISCHARGE ABNORMALITY DUE TO THICKENING |
| 0 | N/A | 5 : DISCHARGE ABNORMALITY |

FIG. 23

INFO-A

TEMPERATURE = xx DEGREE

| ATTENUATION FACTOR | THE NUMBER OF THICKENING ELIMINATION SHOTS |
|---|---|
| $\lambda_a$ | $FC_{Ea}$ |
| $\lambda_b$ | $FC_{Eb}$ |
| ... | ... |
| $\lambda_z$ | $FC_{Ez}$ |

MAINTENANCE METHOD OF LIQUID DISCHARGING APPARATUS

The present application is based on, and claims priority from JP Application Serial Number 2021-009357, filed Jan. 25, 2021, the disclosure of which is hereby incorporated by reference herein in its entirety.

BACKGROUND

1. Technical Field

The present disclosure relates to a maintenance method of a liquid discharging apparatus.

2. Related Art

In a liquid discharging apparatus that discharges liquid such as ink, the thickening of the liquid becomes a problem. In JP-A-2000-233518, a liquid discharging apparatus is disclosed for determining a discharging amount of thickened liquid for a plurality of discharging portions depending on the length of a period that a state, in which the discharging portion is covered by a cap that covers the discharging portion, is maintained.

However, in the above-mentioned technique in the related art, while the discharging amount of each of the plurality of discharging portions is determined to be the same, the thickening state of each of the plurality of discharging portions differs from each other due to various factors such as the state of the liquid inside the discharging portion and the shape inside the discharging portion. Therefore, in the related art, there is a problem that the thickened liquid cannot be sufficiently discharged at the discharging portion where the liquid is more thickened than the assumed thickening state, and also, there is a problem that the liquid, which is not thickened, is discharged at the discharging portion where the liquid is less thickened than the assumed thickening state.

SUMMARY

In order to solve the above problems, a maintenance method for a liquid discharging apparatus according to a preferred embodiment of the present disclosure is a maintenance method for a liquid discharging apparatus including a discharging portion that discharges liquid, the maintenance method includes: acquiring first viscosity information related to viscosity of the liquid inside the discharging portion; discharging a first amount of the liquid from the discharging portion; acquiring second viscosity information related to viscosity of the liquid inside the discharging portion; and discharging a second amount of the liquid based on the first viscosity information and the second viscosity information, from the discharging portion.

BRIEF DESCRIPTION OF THE DRAWINGS

FIG. 9 is an explanatory view for describing generation of coupling state designation signals SLa[m], SLb[m], and SLs[m].

FIG. 10 is an explanatory view for describing generation of determination information Stt in a measurement circuit 9.

FIG. 23 is an explanatory view illustrating an example of the contents of attenuation factor characteristic information INFO-A.

DESCRIPTION OF EXEMPLARY EMBODIMENTS

Hereinafter, an embodiment for carrying out the present disclosure will be described with reference to the drawings. However, in each drawing, the size and scale of each part are appropriately different from the actual ones. Further, the embodiment described below is a desired specific example of the present disclosure, so various technically desirable limitations are attached, but the scope of the present disclosure is not limited to these forms unless otherwise stated to limit the present disclosure in the following description.

1. FIRST EMBODIMENT

In the present embodiment, a liquid discharging apparatus will be described by exemplifying an ink jet printer 1 that discharges ink on a recording paper P to form an image. The ink jet printer 1 is an example of a “liquid discharging apparatus”. The ink is an example of “liquid”. The recording paper P is an example of a “medium”.

1.1. Overview of Ink Jet Printer 1

Figure 1:
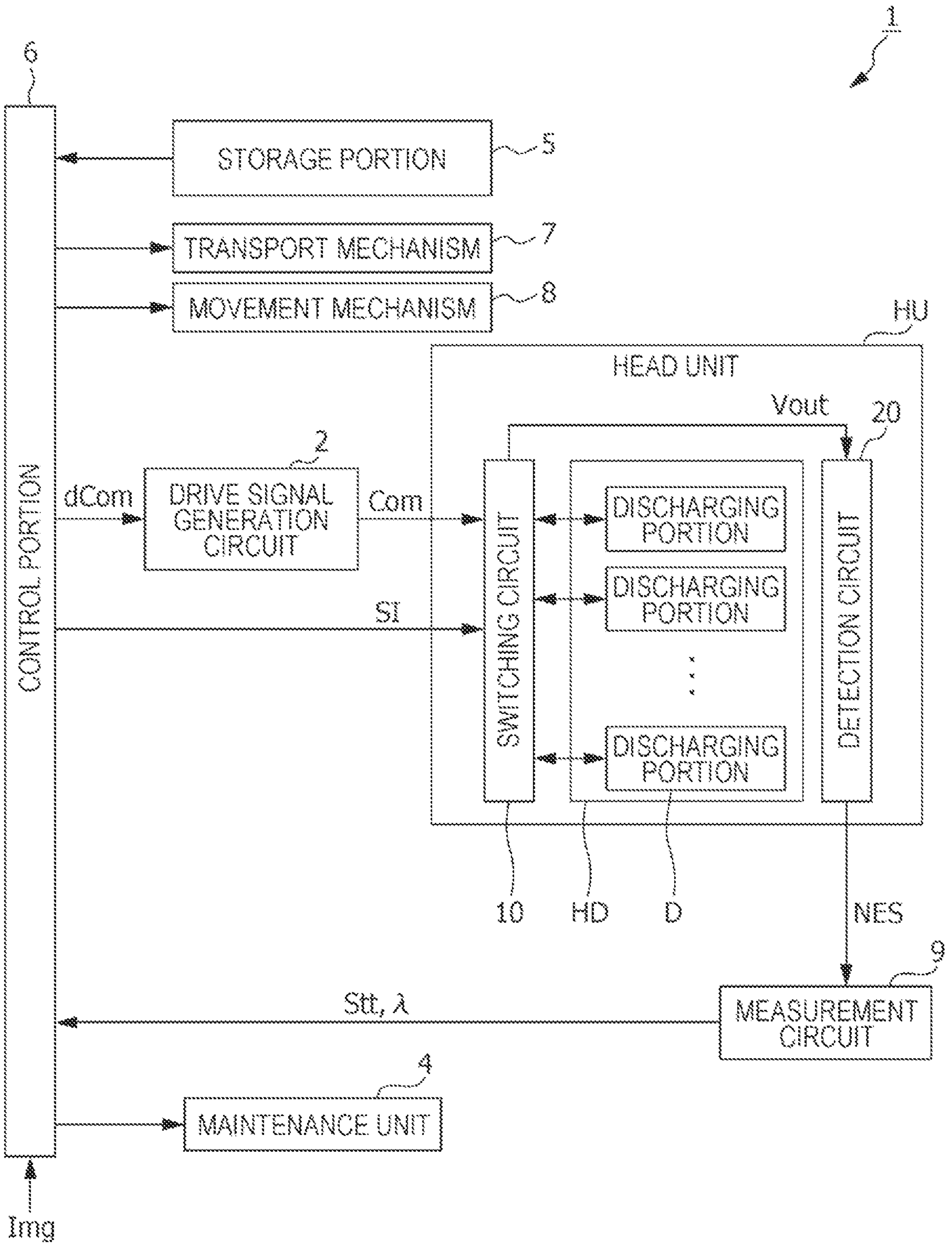
FIG. 1 is a functional block view illustrating an example of a configuration of an ink jet printer 1 according to the present embodiment.
Figure 2:
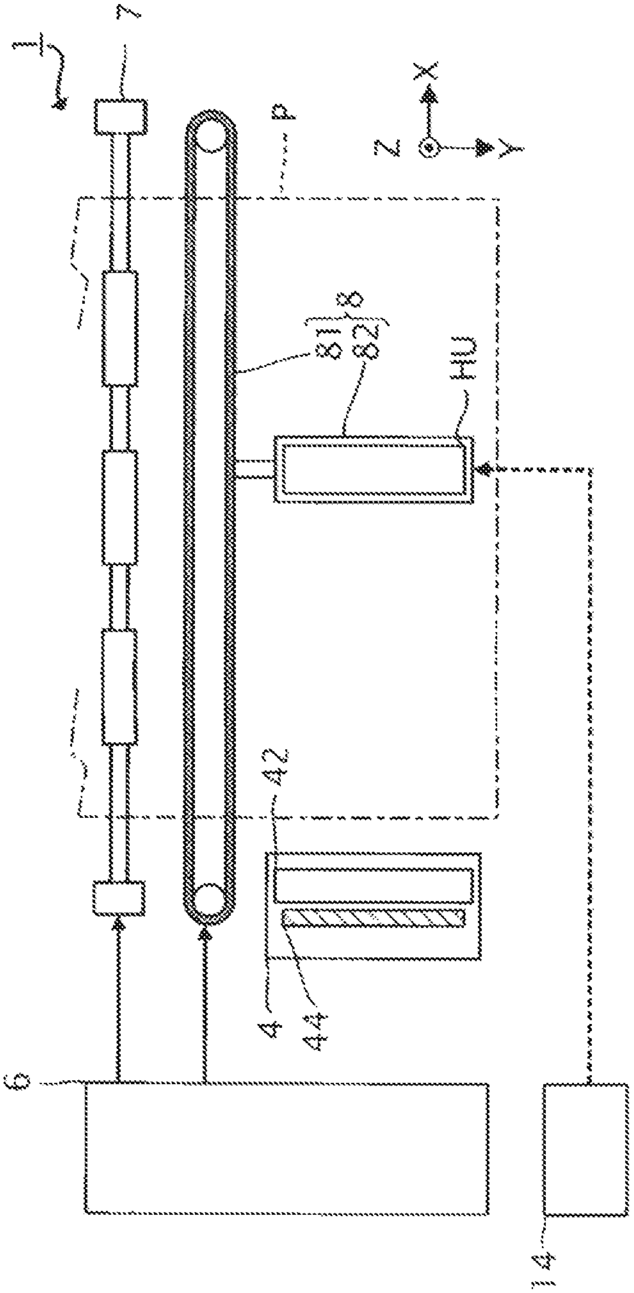
FIG. 2 is a schematic view illustrating the ink jet printer 1.

A configuration of the ink jet printer 1 according to the present embodiment will be described with reference to FIGS. 1 and 2. FIG. 1 is a functional block view illustrating an example of a configuration of the ink jet printer 1 according to the present embodiment. Further, FIG. 2 is a schematic view illustrating the ink jet printer 1.

The ink jet printer 1 is supplied with print data Img indicating an image to be formed by the ink jet printer 1 and information indicating the number of print copies of the image to be formed by the ink jet printer 1 from a host computer such as a personal computer or a digital camera. The ink jet printer 1 executes a printing process of forming the image, which is indicated by the print data Img supplied from the host computer, on a recording paper P.

As illustrated in FIG. 1, the ink jet printer 1 includes a head unit HU provided with a discharging portion D for discharging ink, a control portion 6 that controls an operation of each portion of the ink jet printer 1, a drive signal generation circuit 2 that generates a drive signal Com for driving the discharging portion D, a storage portion 5 that stores a control program of the ink jet printer 1 and other information, a measurement circuit 9 that outputs determination information Stt indicating a result of a discharging state by determining the discharging state of the discharging portion D and an attenuation factor λ which is an example of viscosity information related to the viscosity of ink inside the discharging portion D, a transport mechanism 7 for transporting a recording paper P, a movement mechanism 8 for moving the head unit HU, and a maintenance unit 4 related to a maintenance process that executes maintenance of the discharging portion D such that the ink is discharged normally from the discharging portion D. In the following description, in order to indicate that the attenuation factor λ is a specific value, the attenuation factor $\lambda_x$ may be expressed by using one or more characters x.

In the present embodiment, the head unit HU includes a recording head HD provided with M discharging portions D, a switching circuit 10, and a detection circuit 20. In the present embodiment, M is an integer of 2 or more.

In the following, in order to distinguish each of the M discharging portions D provided in the recording head HD, M discharging portions D may be referred to as a first stage, a second stage, . . . , an M stage in order. Further, the m stage discharging portion D may be referred to as a discharging portion D[m]. The variable m is an integer satisfying 1 or more and M or less. Further, when a component, a signal, or the like of the ink jet printer 1 corresponds to a stage number m of the discharging portion D[m], a symbol for representing the component, the signal, or the like may be represented by adding a suffix[m] indicating that the component, the signal, or the like corresponds to the stages number m.

The switching circuit 10 switches whether or not to supply the drive signal Com output from the drive signal generation circuit 2 to each discharging portion D. Further, the switching circuit 10 switches whether or not to electrically couple each discharging portion D and the detection circuit 20 each other.

The detection circuit 20 generates a residual vibration signal NES[m] indicating vibration remaining in the discharging portion D[m] after the discharging portion D[m] is driven based on a detection signal Vout[m] that is detected from the discharging portion D[m] driven by the drive signal Com. Hereinafter, this vibration is referred to as “residual vibration”.

The measurement circuit 9 generates the determination information Stt[m] indicating the result of a discharging state determination of the discharging portion D[m] and the attenuation factor λ based on the residual vibration signal NES[m]. In the following, the discharging portion D that is a target of the discharging state determination by the measurement circuit 9 may be referred to as a determination target discharging portion D-H. Further, a series of processes executed by the ink jet printer 1 including the discharging state determination, which is executed by the measurement circuit 9, and a preparatory process for the measurement circuit 9 to execute the discharging state determination is referred to as a discharging state determination process.

In the present embodiment, it is assumed that the ink jet printer 1 is a serial printer. Specifically, as illustrated in FIG. 2, the ink jet printer 1 executes a printing process by discharging the ink from the discharging portion D while transporting the recording paper P in a sub-scanning direction and moving the head unit HU in a main scanning direction. In the present embodiment, as illustrated in FIG. 2, the +X direction and the −X direction, which is an opposite direction of the +X direction, are the main scanning directions, and the +Y direction is the sub-scanning direction. Hereinafter, the +X direction and the −X direction are collectively referred to as the “X axis direction”, and hereinafter, the +Y direction and the −Y direction, which is an opposite direction of the +Y direction, are collectively referred to as the “Y axis direction”. Further, a direction perpendicular to the X axis direction and the Y axis direction, and a discharging direction of the ink is referred to as the −Z direction. The −Z direction and the +Z direction, which is an opposite direction of the −Z direction, are collectively referred to as the “Z axis direction”.

The recording head HD and the discharging portion D, which is provided on the recording head HD, will be described with reference to FIG. 3.

Figure 3:
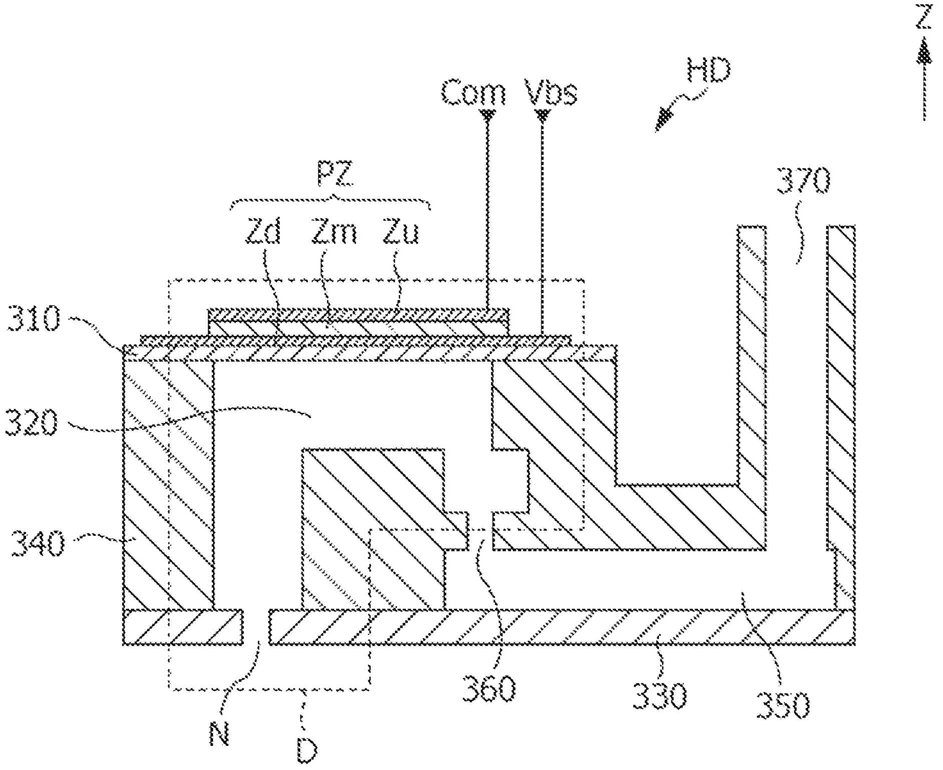
FIG. 3 is a schematic partial cross-sectional view of a recording head HD in which the recording head HD is cut so as to include a discharging portion D.

FIG. 3 is a schematic partial cross-sectional view of the recording head HD in which the recording head HD is cut so as to include the discharging portion D.

As illustrated in FIG. 3, the discharging portion D includes a piezoelectric element PZ, a cavity 320 filled with the ink inside, the nozzle N communicating with the cavity 320, and a vibrating plate 310. The cavity 320 is an example of a “pressure chamber”. The discharging portion D discharges the ink inside the cavity 320 from the nozzle N by supplying the drive signal Com to the piezoelectric element PZ and driving the piezoelectric element PZ by the drive signal Com. The cavity 320 is a space partitioned by a cavity plate 340, a nozzle plate 330 on which the nozzle N is formed, and the vibrating plate 310. The cavity 320 communicates with a reservoir 350 via an ink supply port 360. The reservoir 350 communicates with a liquid container 14 corresponding to the discharging portion D via an ink intake port 370.

In the present embodiment, a unimorph type as illustrated in FIG. 3 is used as the piezoelectric element PZ. The piezoelectric element PZ is not limited to the unimorph type, and a bimorph type, a laminated type, or the like may be used.

The piezoelectric element PZ has an upper electrode Zu, a lower electrode Zd, and a piezoelectric body Zm provided between the upper electrode Zu and the lower electrode Zd. The piezoelectric element PZ is a passive element that deforms in response to a change in potential of the drive signal Com. When a voltage is applied between the upper electrode Zu and the lower electrode Zd by electrically coupling the lower electrode Zd to a feeder line LHd, which is set to a constant potential VBS, and supplying the drive signal Com to the upper electrode Zu, the piezoelectric element PZ is displaced in the +Z direction or the −Z direction according to the applied voltage, and as a result of the displacement, the piezoelectric element PZ vibrates.

A vibrating plate 310 is installed on an upper surface opening portion of the cavity plate 340. The lower electrode Zd is bonded to the vibrating plate 310. Therefore, when the piezoelectric element PZ is driven by the drive signal Com and vibrates, the vibrating plate 310 also vibrates. Thereafter, the volume of the cavity 320 changes due to the vibration of the vibrating plate 310, and the ink that fills the cavity 320 is discharged from the nozzle N. When the ink inside the cavity 320 is reduced due to the discharge of the ink, the ink is supplied from the reservoir 350.

Figure 4:
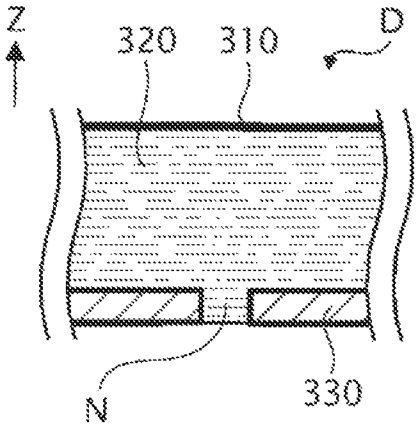
FIG. 4 is an explanatory view for describing an example of a discharging operation of ink in the discharging portion D.
Figure 5:
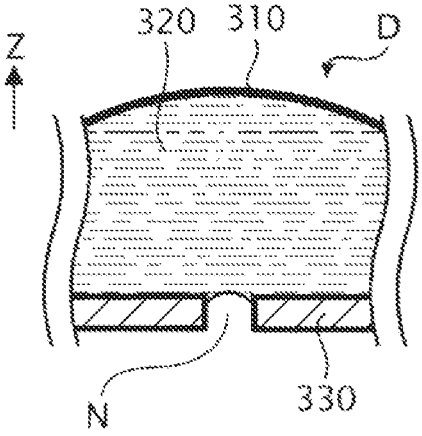
FIG. 5 is an explanatory view for describing an example of a discharging operation of the ink in the discharging portion D.
Figure 6:
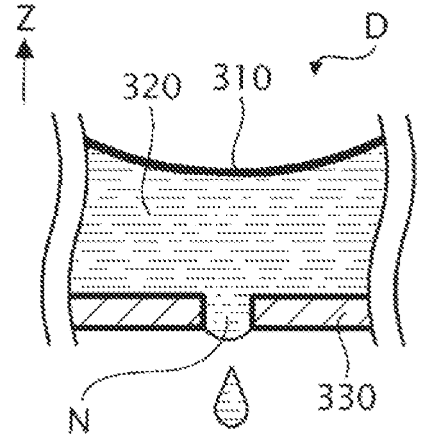
FIG. 6 is an explanatory view for describing an example of a discharging operation of the ink in the discharging portion D.

FIGS. 4 to 6 are explanatory views for describing an example of a discharging operation of the ink in the discharging portion D. As illustrated in FIG. 5, the control portion 6 generates distortion such that the piezoelectric element PZ is displaced in the +Z direction and bends the vibrating plate 310 of the discharging portion D in the +Z direction by changing the potential of the drive signal Com supplied to the piezoelectric element PZ included in the discharging portion D. As a result, as in a state illustrated in FIG. 5, the volume of the cavity 320 of the discharging portion D is expanded as compared with a state illustrated in FIG. 4.

Next, the control portion 6 generates the distortion such that the piezoelectric element PZ is displaced in the −Z direction and bends the vibrating plate 310 of the discharging portion D in the −Z direction by changing the potential of the drive signal Com. As a result, as in the state illustrated in FIG. 6, the volume of the cavity 320 rapidly contracts, and a part of the ink that fills the cavity 320 is discharged as ink droplets from the nozzle N that communicates with the cavity 320. After the piezoelectric element PZ and the vibrating plate 310 are driven by the drive signal Com and displaced in the Z axis direction, the residual vibration is generated in the discharging portion D which includes the vibrating plate 310.

The description is returned to FIGS. 1 and 2. The transport mechanism 7 transports the recording paper P in the +Y direction. Specifically, the transport mechanism 7 is provided with a transporting roller (not illustrated) whose rotation axis is parallel to the X axis direction, and a motor (not illustrated) that rotates the transporting roller under control by the control portion 6.

The movement mechanism 8 reciprocates the head unit HU along the X axis under the control of the control portion 6. As illustrated in FIG. 2, the movement mechanism 8 includes a transporting body 82 having a substantially box shape for accommodating the head unit HU, and an endless belt 81 to which the transporting body 82 is fixed.

The maintenance unit 4 includes a cap 42 for covering each head unit HU so that the nozzle N of the discharging portion D is sealed, a wiper 44 for wiping off foreign matter such as paper dust attached to the vicinity of the nozzle N of the discharging portion D, a tube pump (not illustrated) for sucking the ink, air bubbles, or the like inside the discharging portion D, and a discharging ink receiving portion (not illustrated) for receiving the discharged ink when the ink inside the discharging portion D is discharged. The maintenance unit 4 is provided in an area that does not overlap with the recording paper P when viewed in the Z axis direction.

The storage portion 5 includes a volatile memory such as RAM and a non-volatile memory such as ROM, EEPROM, or PROM, and stores various information such as print data Img supplied from the host computer and a control program of the ink jet printer 1. The RAM is an abbreviation for Random Access Memory. The ROM is an abbreviation for Read Only Memory. The EEPROM is an abbreviation for Electrically Erasable Programmable Read-Only Memory. The PROM is an abbreviation for Programmable ROM.

The control portion 6 includes a CPU. The CPU is an abbreviation for Central Processing Unit. However, the control portion 6 may include a programmable logic device such as an FPGA instead of the CPU. The FPGA is an abbreviation for Field Programmable Gate Array.

In the control portion 6, the CPU provided in the control portion 6 operates according to a control program stored in the storage portion 5, so that the ink jet printer 1 executes the printing process and the maintenance process.

The control portion 6 generates a print signal SI for controlling the head unit HU, a waveform designation signal dCom for controlling the drive signal generation circuit 2, a signal for controlling the transport mechanism 7, and a signal for controlling the movement mechanism 8.

The waveform designation signal dCom is a digital signal that defines a waveform of the drive signal Com. Further, the drive signal Com is an analog signal for driving the discharging portion D. The drive signal generation circuit 2 includes a DA conversion circuit and generates the drive signal Com having a waveform defined by the waveform designation signal dCom. In the present embodiment, it is assumed that the drive signal Com includes a drive signal Com-A and a drive signal Com-B.

Further, the print signal SI is a digital signal for designating the type of operation of the discharging portion D. Specifically, the print signal SI designates the type of operation of the discharging portion D by designating whether or not to supply the drive signal Com with respect to the discharging portion D. The designation of the type of operation of the discharging portion D is, for example, to designate whether or not to drive the discharging portion D, designate whether or not to discharge the ink from the discharging portion D when the discharging portion D is driven, or designate the amount of ink discharged from the discharging portion D when the discharging portion D is driven.

When the printing process is executed, the control portion 6 first stores the print data Img, which is supplied from the host computer, in the storage portion 5. Next, the control portion 6 generates various control signals such as the print signal SI, the waveform designation signal dCom, the signal for controlling the transport mechanism 7, and the signal for controlling the movement mechanism 8 based on various data such as the print data Img stored in the storage portion 5. Thereafter, the control portion 6 controls the head unit HU so that the discharging portion D is driven while controlling the transport mechanism 7 and the movement mechanism 8 so as to change a relative position of the recording paper P with respect to the head unit HU based on the various control signals and various data stored in the storage portion 5. As a result, the control portion 6 adjusts the presence/absence of the discharging of the ink from the discharging portion D, the discharging amount of ink, the discharging timing of the ink, and the like, and controls the execution of the printing process for forming an image corresponding to the print data Img on the recording paper P.

As described above, in the ink jet printer 1 according to the present embodiment executes a discharging state determination process of determining whether or not the discharging state of the ink from each discharging portion D is normal, that is whether or not a discharge abnormality occurred in each discharging portion D, based on the determination information Stt output from the measurement circuit 9.

The discharge abnormality is a state in which even when a user tries to discharge the ink from the discharging portion D by driving the discharging portion D by the drive signal Com, the ink cannot be discharged according to an aspect defined by the drive signal Com. The discharging aspect of the ink defined by the drive signal Com is that the discharging portion D discharges an amount of ink defined by the waveform of the drive signal Com, and the discharging portion D discharges the ink at a discharging speed defined by the waveform of the drive signal Com. That is, a state, in which the ink cannot be discharged according to the ink discharging aspect defined by the drive signal Com, includes a state, in which an amount of ink smaller than the discharging amount of ink defined by the drive signal Com is discharged from the discharging portion D, a state, in which an amount of ink greater than the discharging amount of ink defined by the drive signal Com is discharged from the discharging portion D, and a state, in which the ink cannot be landed at a desired landing position on the recording paper P because the ink is discharged at a speed different from the ink discharging speed defined by the drive signal Com, in addition to a state in which the ink cannot be discharged from the discharging portion D.

In the discharging state determination process, the ink jet printer 1 executes a series of processes of a first process, a second process, a third process, a fourth process, and a fifth process, which are described below. In the first process, the control portion 6 selects a determination target discharging portion D-H from among M discharging portions D provided in the head unit HU. In the second process, the control portion 6 generates the residual vibration in the determination target discharging portion D-H by driving the determination target discharging portion D-H. In the third process, the detection circuit 20 generates a residual vibration signal NES based on a detection signal Vout detected from the determination target discharging portion D-H. In the fourth process, the measurement circuit 9 performs a discharging state determination targeting the determination target discharging portion D-H based on the residual vibration signal NES and generates the determination information Stt indicating the result of the determination. In the fifth process, the control portion 6 stores the determination information Stt in the storage portion 5.

As described above, the ink jet printer 1 according to the present embodiment executes a maintenance process for normally recovering the discharging state of the ink in the discharging portion D in which the discharge abnormality occurred.

Further, in the ink jet printer 1 of the present embodiment, before the printing process and after the printing process, the maintenance process for keeping the viscosity of the ink in the discharging portion D within an appropriate range is performed in all of the M discharging portions D.

Specifically, the maintenance process is a process for returning the discharging state of the ink of the discharging portion D to a normal state by executing a process once or a plurality of times among a wiping process, a pumping process, and a flushing process. The wiping process is a process of wiping off foreign matter such as paper dust attached to the vicinity of the nozzle N of the discharging portion D with a wiper 44. The pumping process is a process of sucking the ink, air bubbles, or the like inside the discharging portion D by a tube pump. The flushing process is a process of discharging the ink from the discharging portion D by driving the discharging portion D. In the following description, the amount of ink discharged by one flushing process may be referred to as a "unit amount of flushing". Further, in order to eliminate the thickening of the ink inside the discharging portion D, the ink jet printer 1 executes a thickening elimination process using the residual vibration. The ink jet printer 1 executes the flushing process once or a plurality of times in the thickening elimination process using residual vibration. Hereinafter, the number of times the flushing process is executed may be referred to as "the number of shots FC". In the following description, in order to indicate that the number of shots FC is a specific value, the number of shots $FC_x$ may be expressed by using one or more characters x.

The ink jet printer 1 may be capable of executing a plurality of types of flushing processes. For example, the ink jet printer 1 may execute the first flushing process and the second flushing process, in which the unit amount of flushing is smaller than that of the first flushing process but the ink can be discharged even when the thickening of the ink progresses to the extent that it is difficult to discharge the ink in the first flushing process. Hereinafter, for the sake of brevity, the ink jet printer 1 will be described as executing one type of flushing process once or a plurality of times.

1.2. Configuration of Head Unit HU

Hereinafter, a configuration of the head unit HU will be described with reference to FIG. 7.

Figure 7:
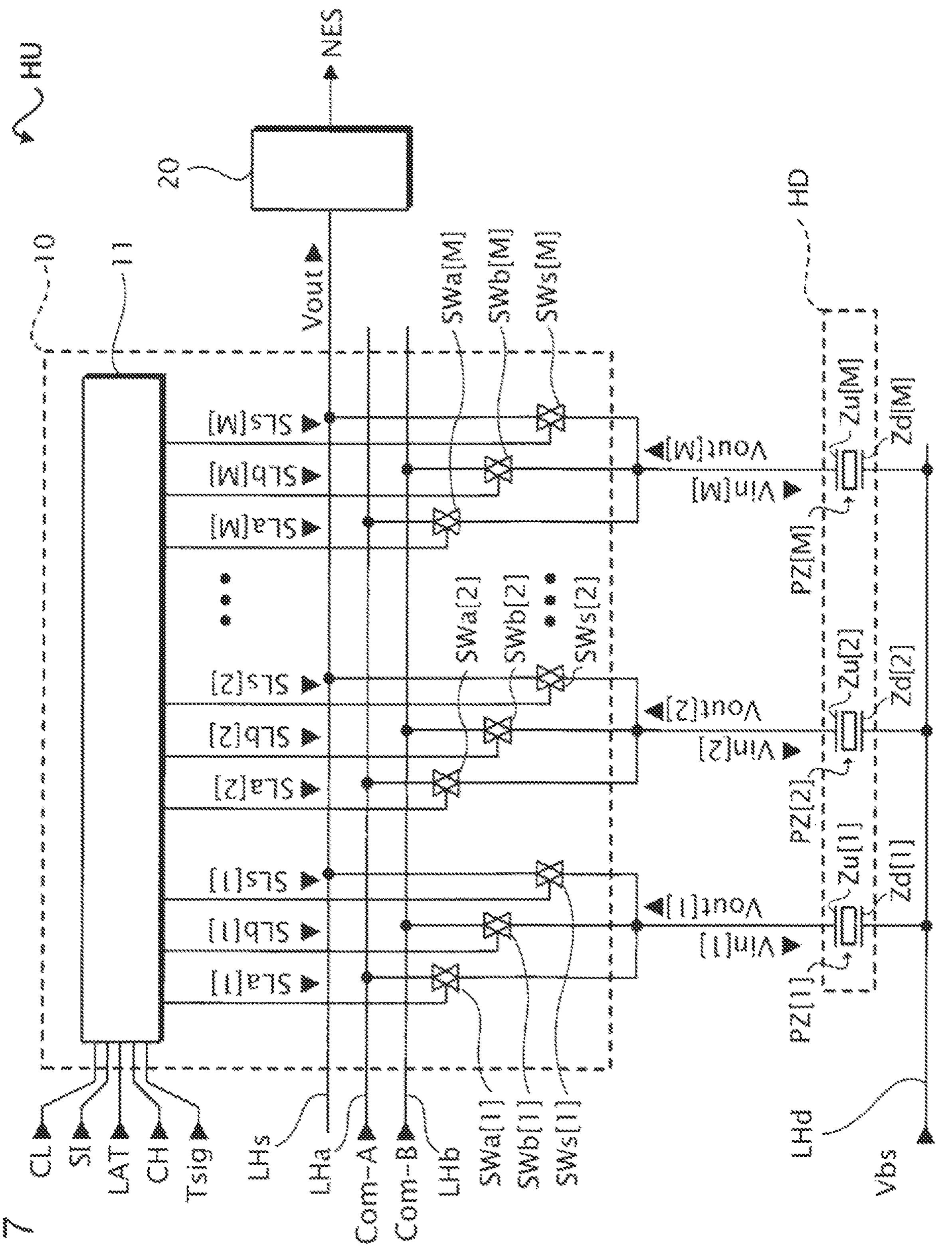
FIG. 7 is a block view illustrating an example of a configuration of the head unit HU.

FIG. 7 is a block view illustrating an example of a configuration of the head unit HU. As described above, the head unit HU includes the recording head HD, the switching circuit 10, and the detection circuit 20. Further, the head unit HU includes an internal wiring LHa to which the drive signal Com-A is supplied from the drive signal generation circuit 2, an internal wiring LHb to which the drive signal Com-B is supplied from the drive signal generation circuit 2, and an internal wiring LHs for supplying the detection signal Vout detected from the discharging portion D to the detection circuit 20.

As illustrated in FIG. 7, the switching circuit 10 includes M switches SWa[1] to SWa[m], M switches SWb[1] to SWb[m], M switches SWs[1] to SWs[m], and a coupling state designation circuit 11 that designates a coupling state of each switch. As each switch, for example, a transmission gate can be used.

The coupling state designation circuit 11 generates coupling state designation signals SLa[1] to SLa[m] that designate the on/off of the switches SWa[1] to SWa[m], coupling state designation signals SLb[1] to SLb[m] that designate on/off of the switches SWb[1] to SWb[m], and coupling state designation signals SLs[1] to SLs[m] that designate on/off of the switches SWs[1] to SWs[m] based on at least a part of a signal of the print signal SI, the latch signal LAT, the change signal CH, and the period designation signal Tsig supplied from the control portion 6.

The switch SWa[m] switches between conduction and non-conduction between the internal wiring LHa and the upper electrode Zu[m] of the piezoelectric element PZ[m] provided in the discharging portion D[m] according to the coupling state designation signal SLa[m]. For example, the switch SWa[m] turns on when the coupling state designation signal SLa[m] is at a high level and turns off when the coupling state designation signal SLa[m] is at a low level.

The switch SWb[m] switches between conduction and non-conduction between the internal wiring LHb and the upper electrode Zu[m] of the piezoelectric element PZ[m] provided in the discharging portion D[m] according to the coupling state designation signal SLb[m]. For example, the switch SWb[m] turns on when the coupling state designation signal SLb[m] is at a high level and turns off when the coupling state designation signal SLb[m] is at a low level.

Of the drive signals Com-A and Com-B, the signal that is actually supplied to the piezoelectric element PZ[m] of the discharging portion D[m] via the switch SWa[m] or SWb[m] may be referred to as a supply drive signal Vin[m].

The switch SWs[m] switches between conduction and non-conduction between the internal wiring LHs and the upper electrode Zu[m] of the piezoelectric element PZ[m] provided in the discharging portion D[m] according to the coupling state designation signal SLs[m]. For example, the switch SWs[m] turns on when the coupling state designation signal SLs[m] is at a high level and turns off when the coupling state designation signal SLs[m] is at a low level.

The detection circuit 20 is supplied with the detection signal Vout[m], which is output from the piezoelectric element PZ[m] of the discharging portion D[m] driven as the determination target discharging portion D-H, via the internal wiring LHs. Thereafter, the detection circuit 20 generates a residual vibration signal NES based on the detection signal Vout[m].

1.3. Operation of Head Unit HU

Hereinafter, the operation of the head unit HU will be described with reference to FIGS. 8 and 9.

In the present embodiment, an operating period of the ink jet printer 1 includes one or a plurality of unit periods Tu. In the ink jet printer 1 according to the present embodiment, in each unit period Tu, it is assumed to execute one of the driving of each discharging portion D in the printing process, and the driving of the determination target discharging portion D-H in the preparatory process of the discharging state determination process and the detection of the residual vibration. However, the present disclosure is not limited to such an aspect, and in each unit period Tu, it may be possible to execute both of the driving of each discharging portion D in the printing process, and the driving of the determination target discharging portion D-H in the preparatory process of the discharging state determination process and the detection of the residual vibration.

In general, the ink jet printer 1 forms an image indicating the print data Img by repeatedly executing the printing process over a plurality of continuous or intermittent unit periods Tu to discharge the ink once or a plurality of times from each discharging portion D. Further, in the M unit periods Tu provided continuously or intermittently, the ink jet printer 1 according to the present embodiment executes the discharging state determination process in which each of the M discharging portions D[1] to D[m] is defined as the determination target discharging portion D-H by executing the preparatory process of the discharging state determination process M times.

Figure 8:
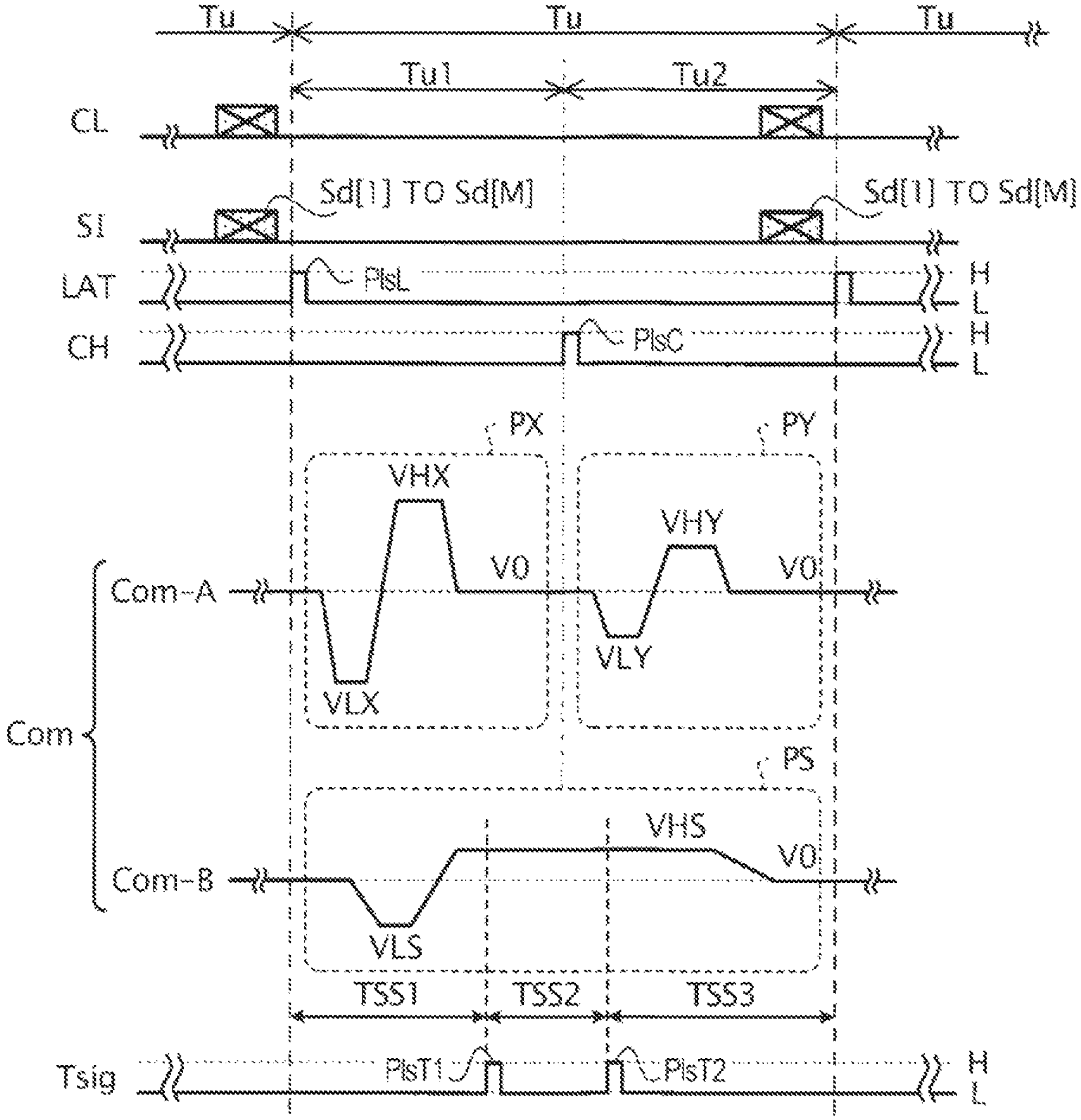
FIG. 8 is a view illustrating a timing chart for describing an operation of the ink jet printer 1 in a unit period Tu.

FIG. 8 illustrates a timing chart for describing an operation of the ink jet printer 1 in the unit period Tu.

As illustrated in FIG. 8, the control portion 6 outputs the latch signal LAT having a pulse PlsL and the change signal CH having a pulse PlsC. As a result, the control portion 6 defines the unit period Tu as a period from the rise of the pulse PlsL to the rise of the next pulse PlsL. Further, the control portion 6 divides the unit period Tu into two control periods Tu1 and Tu2 by the pulse PlsC.

The print signal SI includes individual designation signals Sd[1] to Sd[m] that designate the driving aspects of the discharging portions D[1] to D[m] in each unit period Tu. Thereafter, when at least one of the printing process and the discharging state determination process is executed in the unit period Tu, as illustrated in FIG. 8, the control portion 6 synchronizes the print signal SI including the individual designation signals Sd[1] to Sd[m] with the clock signal CL prior to the start of the unit period Tu and supplies the print signal SI to the coupling state designation circuit 11. In this case, the coupling state designation circuit 11 generates coupling state designation signals SLa[m], SLb[m], and SLs[m] based on the individual designation signal Sd[m] in the unit period Tu.

The individual designation signal Sd[m] according to the present embodiment is a signal that designates any one of the driving aspects among the five driving aspects of driving as the discharge of the amount of ink corresponding to a large dot, the discharge of the amount of ink corresponding to a medium dot, the discharge of the amount of ink corresponding to a small dot, the non-discharge of the ink, and the determination target in the discharging state determination process, with respect to the discharging portion D[m], in each unit period Tu. In the following description, the amount corresponding to the large dot may be referred to as a "large amount", and the discharge of the amount of ink corresponding to the large dot may be referred to as a "formation of a large dot". Similarly, the amount corresponding to the medium dot may be referred to as a "medium amount", and the discharge of the amount of ink corresponding to the medium dot may be referred to as a "formation of a medium dot". Similarly, the amount corresponding to the small dot may be referred to as a "small amount", and the discharge of the amount of ink corresponding to the small dot may be referred to as a "formation of a small dot". The driving as the determination target in the discharging state determination process may be referred to as a "driving as a determination target discharging portion D-H". In the present embodiment, as an example, it is assumed that the individual designation signal Sd[m] is a 3-bit digital signal as illustrated in FIG. 9.

As illustrated in FIG. 8, the drive signal generation circuit 2 outputs the drive signal Com-A having a medium dot waveform PX provided in a control period Tu2 and a small dot waveform PY provided in a control period Tu2. In the present embodiment, the medium dot waveform PX and the small dot waveform PY are defined such that a potential difference between the maximum potential VHX and the minimum potential VLX of the medium dot waveform PX is greater than a potential difference between the maximum potential VHY and the minimum potential VLY of the small dot waveform PY. Specifically, when the discharging portion D[m] is driven by the drive signal Com-A having the medium dot waveform PX, the medium dot waveform PX is defined such that a medium amount of ink is discharged from the discharging portion D[m]. Further, when the discharging portion D[m] is driven by the drive signal Com-A having the small dot waveform PY, the small dot waveform PY is defined such that a small amount of ink is discharged from the discharging portion D[m]. The potentials at the start and end of the medium dot waveform PX and the small dot waveform PY are set to a reference potential V0.

Thereafter, when the individual designation signal Sd[m] designates the formation of the large dot with respect to the discharging portion D[m], the coupling state designation circuit 11 sets the coupling state designation signal SLa[m] to a high level in the control periods Tu1 and Tu2, and sets the coupling state designation signals SLb[m] and SLs[m] to a low level in the unit period Tu. In this case, the discharging portion D[m] is driven by the drive signal Com-A of the medium dot waveform PX in the control period Tu1 to discharge the medium amount of ink, and driven by the drive signal Com-A of the small dot waveform PY in the control period Tu2 to discharge the small amount of ink. As a result, the discharging portion D[m] discharges a large amount of ink in total in the unit period Tu, and large dots are formed on the recording paper P.

Further, when the individual designation signal Sd[m] designates the formation of the medium dot with respect to the discharging portion D[m], the coupling state designation circuit 11 sets the coupling state designation signal SLa[m] to a high level in the control period Tu1 and a low level in the control period Tu2, respectively, and sets the coupling state designation signals SLb[m] and SLs[m] to a low level in the unit period Tu. In this case, the discharging portion D[m] discharges the medium amount of ink in the unit period Tu, and medium dots are formed on the recording paper P.

Further, when the individual designation signal Sd[m] designates the formation of the small dot with respect to the discharging portion D[m], the coupling state designation circuit 11 sets the coupling state designation signal SLa[m] to a low level in the control period Tu2 and a high level in the control period Tu2, respectively, and sets the coupling state designation signals SLb[m] and SLs[m] to a low level in the unit period Tu. In this case, the discharging portion D[m] discharges the small amount of ink in the unit period Tu, and small dots are formed on the recording paper P.

Further, when the individual designation signal Sd[m] designates the non-discharge of the ink with respect to the discharging portion D[m], the coupling state designation circuit 11 sets the coupling state designation signals SLa[m], SLb[m], and SLs[m] to a low level in the unit period Tu. In this case, the discharging portion D[m] does not discharge the ink and does not form dots on the recording paper P in the unit period Tu.

As illustrated in FIG. 8, the drive signal generation circuit 2 outputs the drive signal Com-B having an inspection waveform PS provided in the unit period Tu. In the present embodiment, the inspection waveform PS is defined such that a potential difference between the maximum potential VHS and the minimum potential VLS of the inspection waveform PS is smaller than a potential difference between the maximum potential VHY and the minimum potential VLY of the small dot waveform PY. Specifically, when the discharging portion D[m] is supplied with the drive signal Com-B having the inspection waveform PS, the inspection waveform PS is defined such that the discharging portion D[m] is driven to the extent that the ink is not discharged from the discharging portion D[m]. The potential at the start and end of the inspection waveform PS is set to the reference potential V0.

Further, the control portion 6 outputs the period designation signal Tsig having the pulse PlsT1 and the pulse PlsT2. As a result, the control portion 6 divides the unit period Tu into a control period TSS1, which is from the start of the pulse PlsL to the start of the pulse PlsT1, a control period TSS2, which is from the start of the pulse PlsT1 to the start of the pulse PlsT2, and a control period TSS3, which is from the start of pulse PlsT2 to the start of the next pulse PlsL.

Further, when the individual designation signal Sd[m] designates the discharging portion D[m] as the determination target discharging portion D-H, the coupling state designation circuit 11 sets the coupling state designation signal SLa[m] to a low level in the unit period Tu, sets the coupling state designation signal SLb[m] to a high level in the control periods TSS1 and TSS3 and to a low level in the control period TSS2, respectively, and sets the coupling state designation signal SLs[m] to a low level in the control periods TSS1 and TSS3 and to a high level in the control period TSS2, respectively.

In this case, the determination target discharging portion D-H is driven by the drive signal Com-B of the inspection waveform PS in the control period TSS1. Specifically, the piezoelectric element PZ included in the determination target discharging portion D-H is displaced by the drive signal Com-B of the inspection waveform PS in the control period TSS1. As a result, vibration is generated in the determination target discharging portion D-H, and this vibration remains even in the control period TSS2. In the control period TSS2, the upper electrode Zu included in the piezoelectric element PZ of the determination target discharging portion D-H changes the potential according to the residual vibration generated in the determination target discharging portion D-H. In other words, in the control period TSS2, the upper electrode Zu included in the piezoelectric element PZ of the determination target discharging portion D-H indicates a potential corresponding to an electromotive force of the piezoelectric element PZ caused by the residual vibration generated in the determination target discharging portion D-H. Thereby, the potential of the upper electrode Zu can be detected as the detection signal Vout in the control period TSS2.

FIG. 9 is an explanatory view for describing the generation of the coupling state designation signals SLa[m], SLb[m], and SLs[m]. The coupling state designation circuit 11 generates the coupling state designation signals SLa[m], SLb[m], and SLs[m] by decoding the individual designation signal Sd[m] according to FIG. 9.

As illustrated in FIG. 9, the individual designation signal Sd[m] according to the present embodiment indicates any one of a value (1, 1, 0) that designates the formation of the large dot, a value (1, 0, 0,) that designates the formation of the medium dot, a value (0, 1, 0) that designates the formation of the small dot, a value (0, 0, 0) that designates the non-discharge of the ink, and a value (1, 1, 1) that designates the driving as the determination target discharging portion D-H. Further, the coupling state designation circuit 11 sets the coupling state designation signal SLa[m] to a high level in the control periods Tu1 and Tu2 when the individual designation signal Sd [m] indicates (1, 1, 0), sets the coupling state designation signal SLa[m] to a high level in the control period Tu1 when the individual designation signal Sd[m] indicates (1, 0, 0), sets the coupling state designation signal SLa[m] to a high level in the control period Tu2 when the individual designation signal Sd[m] indicates (0, 1, 0), sets the coupling state designation signal SLb[m] to a high level in the control periods TSS1 and TSS3 and sets the coupling state designation signal SLs[m] to a high level in the control period TSS2 when the individual designation signal Sd[m] indicates (1, 1, 1), and sets each signal to a low level when the above does not apply.

As described above, the detection circuit 20 generates the residual vibration signal NES based on the detection signal Vout. The residual vibration signal NES is a signal obtained by shaping the detection signal Vout into a waveform suitable for processing in the measurement circuit 9 by amplifying the amplitude of the detection signal Vout and removing the noise component from the detection signal Vout. The residual vibration signal NES is an analog signal.

The detection circuit 20 may be configured to include, for example, a negative feedback type amplifier for amplifying the detection signal Vout, a low-pass filter for attenuating the high frequency component of the detection signal Vout, and a voltage follower that converts impedance and outputs low impedance residual vibration signal NES.

1.4. Measurement Circuit 9

Next, the measurement circuit 9 will be described.

Generally, the residual vibration generated in the discharging portion D has a natural vibration frequency determined by the shape of the nozzle N, the weight of the ink that fills the cavity 320, the viscosity of the ink that fills the cavity 320, and the like.

Further, in general, when a discharge abnormality occurs in the discharging portion D because air bubbles are mixed in the cavity 320 of the discharging portion D, the frequency of the residual vibration becomes higher as compared with the case where the air bubbles are not mixed in the cavity 320. Further, in general, when a discharge abnormality occurs in the discharging portion D because foreign matter such as paper dust is attached to the vicinity of the nozzle N of the discharging portion D, the frequency of the residual vibration becomes lower as compared with the case where foreign matter is not attached. Further, in general, when the viscosity of the ink that fills the cavity 320 of the discharging portion D is high, the frequency of residual vibration becomes lower as compared with the case where the viscosity is low. Further, in general, when a discharge abnormality occurs in the discharging portion D because the ink that fills the cavity 320 of the discharging portion D is thickened, the frequency of the residual vibration becomes lower as compared with the case where foreign matter such as paper dust is attached to the vicinity of the nozzle N of the discharging portion D. Further, in general, when a discharge abnormality occurs in the discharging portion D because the cavity 320 of the discharging portion D is not filled with the ink, or when a discharge abnormality occurs in the discharging portion D because the piezoelectric element PZ fails and cannot be displaced, the amplitude of the residual vibration becomes small.

As described above, the residual vibration signal NES indicates a waveform corresponding to the residual vibration generated in the determination target discharging portion D-H. Specifically, the residual vibration signal NES indicates a frequency corresponding to the frequency of the residual vibration generated in the determination target discharging portion D-H and indicates an amplitude corresponding to the amplitude of the residual vibration generated in the determination target discharging portion D-H. Therefore, the measurement circuit 9 can perform detection of the determination information Stt used for the discharging state determination for determining the discharging state of the ink in the determination target discharging portion D-H based on the residual vibration signal NES. Further, the measurement circuit 9 can perform detection of the attenuation factor λ which is the viscosity information of the ink in the determination target discharging portion D-H based on the residual vibration signal NES.

The measurement circuit 9 measures the time length NTc of one period of the residual vibration signal NES and generates period information Info-T indicating the measurement result.

Further, the measurement circuit 9 generates amplitude information Info-S indicating whether or not the residual vibration signal NES has a predetermined amplitude. Specifically, in the period during which the time length NTc of one period of the residual vibration signal NES is being measured, the measurement circuit 9 determines whether or not the potential of the residual vibration signal NES is equal to or higher than a threshold potential Vth-O, which is a higher potential than the amplitude center level potential Vth-C of the residual vibration signal NES and is equal to or lower than the threshold potential Vth-U, which is a lower potential than the potential Vth-C. Thereafter, when the result of the determination is positive, a value indicating that the residual vibration signal NES has a predetermined amplitude, for example, "1" is set in the amplitude information Info-S, and when the result of the determination is negative, a value indicating that the residual vibration signal NES does not have the predetermined amplitude, for example, "0" is set in the amplitude information Info-S.

Thereafter, the measurement circuit 9 generates the determination information Stt indicating the determination result of the discharging state of the ink in the determination target discharging portion D-H based on the period information Info-T and the amplitude information Info-S.

FIG. 10 is an explanatory view for describing generation of the determination information Stt in a measurement circuit 9.

As illustrated in FIG. 10, by comparing the time length NTc indicating the period information Info-T with a part or all of a threshold value Tth1, a threshold value Tth2, and a threshold value Tth3, the measurement circuit 9 determines the discharging state in the determination target discharging portion D-H and generates the determination information Stt indicating the result of the determination.

The threshold value Tth1 is a value for indicating a boundary between the time length of one period of the residual vibration when the discharging state of the determination target discharging portion D-H is normal and the time length of one period of the residual vibration when the air bubbles are mixed in the cavity 320. Further, the threshold value Tth2 is a value for indicating a boundary between the time length of one period of the residual vibration when the discharging state of the determination target discharging portion D-H is normal and the time length of one period of the residual vibration when foreign matter is attached in the vicinity of the nozzle N. The threshold value Tth3 is a value for indicating a boundary between the time length of one period of the residual vibration when the foreign matter is attached in the vicinity of the nozzle N of the determination target discharging portion D-H and the time length of one period of the residual vibration when the ink inside the cavity 320 is thickened. The threshold values Tth1 to Tth3 satisfy "Tth1<Tth2<Tth3".

As illustrated in FIG. 10, in the present embodiment, when the value of the amplitude information Info-S is "1" and the time length NTc indicating the period information Info-T satisfies "Tth1 NTc Tth2", it is considered that the discharging state of the ink in the determination target discharging portion D-H is normal. In this case, the measurement circuit 9 sets a value "1" indicating that the discharging state of the determination target discharging portion D-H is normal, to the determination information Stt.

Further, when the value of the amplitude information Info-S is "1" and the time length NTc indicating the period information Info-T satisfies "NTc<Tth1", it is considered that a discharge abnormality due to air bubbles occurred in the determination target discharging portion D-H. In this case, the measurement circuit 9 sets a value "2" indicating that the discharge abnormality due to air bubbles occurred in the determination target discharging portion D-H, to the determination information Stt.

Further, when the value of the amplitude information Info-S is "1" and the time length NTc indicating the period information Info-T satisfies "Tth2<NTc≤Tth3", it is considered that a discharge abnormality due to attachment of foreign matter occurred in the determination target discharging portion D-H. In this case, the measurement circuit 9 sets a value "3" indicating that the discharge abnormality due to the attachment of foreign matter occurred in the determination target discharging portion D-H, to the determination information Stt.

Further, when the value of the amplitude information Info-S is "1" and the time length NTc indicating the period information Info-T satisfies "Tth3<NTc", it is considered that a discharge abnormality due to thickening occurred in the determination target discharging portion D-H. In this case, the measurement circuit 9 sets a value "4" indicating that the discharge abnormality due to the thickening occurred in the determination target discharging portion D-H, to the determination information Stt.

Further, even when the value of the amplitude information Info-S is "0", it is considered that a discharge abnormality occurred in the determination target discharging portion D-H. In this case, the measurement circuit 9 sets a value "5" indicating that the discharge abnormality occurred in the determination target discharging portion D-H, to the determination information Stt.

Thereafter, the control portion 6 stores the determination information Stt, which is generated by the measurement circuit 9, in the storage portion 5 in association with the stage number m of the determination target discharging portion D-H corresponding to the determination information Stt. As a result, the control portion 6 manages the determination information Stt[1] to Stt[m] corresponding to the discharging portions D[1] to D[m].

As described above, when a discharge abnormality occurs in the discharging portion D because the ink that fills the cavity 320 of the discharging portion D is thickened, the frequency of the residual vibration becomes lower as compared with the case where foreign matter such as paper dust is attached to the vicinity of the nozzle N of the discharging portion D. Further, as the thickening progresses, the degree to which the magnitude of the amplitude reduced with the lapse of the period increases.

Figure 11:
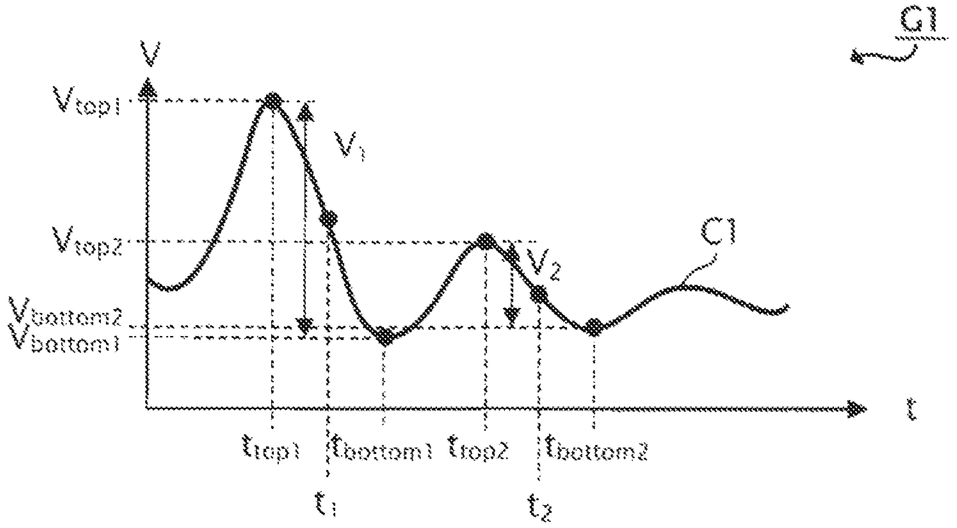
FIG. 11 is an explanatory view for describing generation of an attenuation factor λ in the measurement circuit 9.

FIG. 11 is an explanatory view for describing generation of the attenuation factor λ in the measurement circuit 9.

The measurement circuit 9 specifies the viscosity of each of the discharging portions D[1] to D[m] by obtaining the attenuation factor λ indicating the degree to which the amplitude of the residual vibration is reduced per unit time for each of the discharging portions D[1] to D[m]. The attenuation factor λ is an example of "information obtained by displacing the piezoelectric element", also an example of "information obtained by displacing the piezoelectric element such that the liquid is not discharged from the discharging portion", and also an example of "information based on the residual vibration generated in the discharging portion after the drive signal is supplied to the piezoelectric element".

The waveform C1 shown in the graph G1 illustrated in FIG. 11 indicates a waveform along the time series of the residual vibration. In order to calculate the attenuation factor λ, the measurement circuit 9 executes the first process, the second process, the third process, and the fourth process described below. In the first process, the measurement circuit 9 executes a low-pass filter with respect to the residual vibration signal NES [m] to remove the high frequency band.

In the second process, the measurement circuit 9 acquires a voltage value $V_{top1}$, time information $t_{top1}$, a voltage value $V_{bottom1}$, time information $t_{bottom1}$, a voltage value $V_{top2}$, time information $t_{top2}$, a voltage value $V_{bottom2}$, and time information $t_{bottom2}$ illustrated in FIG. 11, based on the residual vibration signal NES[m] with the high frequency band removed. The voltage value $V_{top1}$ is the maximum value of the voltage in the first period of the residual vibration. The time information $t_{top1}$ indicates the time at which the voltage in the first period of the residual vibration reaches the maximum value. The voltage value $V_{bottom1}$ is the minimum value of the voltage in the first period of the residual vibration. The time information $t_{bottom1}$ indicates the time at which the voltage in the first period of the residual vibration reaches the minimum value. The voltage value $V_{top2}$ is the maximum value of the voltage in the second period of the residual vibration. The time information $t_{top2}$ indicates the time at which the voltage in the second period of the residual vibration reaches the maximum value. The voltage value $V_{bottom2}$ is the minimum value of the voltage in the second period of the residual vibration. The time information $t_{bottom2}$ indicates the time at which the voltage in the second period of the residual vibration reaches the minimum value.

In the third process, the measurement circuit 9 calculates an amplitude $V_1$ of the first period of the residual vibration, an amplitude $V_2$ of the second period of the residual vibration, the time information $t_1$ indicating the time that is the center of the amplitude in the first period of residual vibration, and the time information $t_2$ indicating the time that is the center of the amplitude in the second period of residual vibration, based on each information acquired by the second process. Specifically, the measurement circuit 9 calculates the amplitude $V_1$ by using the following equation (1), calculates the amplitude $V_2$ by using the following equation (2), calculates the time information $t_1$ by using the following equation (3), and calculates the time information $t_2$ by using the following equation (4).

$$V_1 = V_{top1} - V_{bottom1} \tag{1}$$

$$V_2 = V_{top2} - V_{bottom2} \tag{2}$$

$$t_1 = (t_{top1} - t_{bottom1})/2 + t_{top1} \tag{3}$$

$$t_2 = (t_{top2} - t_{bottom2})/2 + t_{top2} \tag{4}$$

In the fourth process, the measurement circuit 9 calculates the attenuation factor λ based on each information calculated in the third process. Specifically, the measurement circuit 9 calculates the attenuation factor λ by using the following equation (5).

$$\lambda = \frac{1}{t_2 - t_1} \ln \frac{V_1}{V_2} \tag{5}$$

Wherein, ln(x) means the natural logarithm of x. As shown in the equation (5), the attenuation factor λ indicates the degree to which the amplitude of the residual vibration is reduced per unit period. As the thickening inside the discharging portion D progresses, the degree, to which the amplitude is reduced, increases. Therefore, the attenuation factor λ is a value that increases monotonically as the viscosity of the ink inside the discharging portion D is thickened, and it can be said that it represents the viscosity of the ink inside the discharging portion D. Regarding the calculation of the attenuation factor λ in the equation (5), as illustrated in FIG. 11, the voltage at the center of the amplitude in the second period of the residual vibration is lower than the voltage at the center of the amplitude in the first period of the residual vibration. In this way, the center of the amplitude of the residual vibration may deviate with the lapse of the period. In the equation (5), the deviation of the center of this amplitude is corrected by using $(1/(t_2-t_1))$.

1.5. Adjustment of the Number of Shots FC Based on Attenuation Factor λ

Next, an example of adjusting the number of shots FC in the flushing process based on the attenuation factor λ by the control portion 6 will be described.

Figure 12:
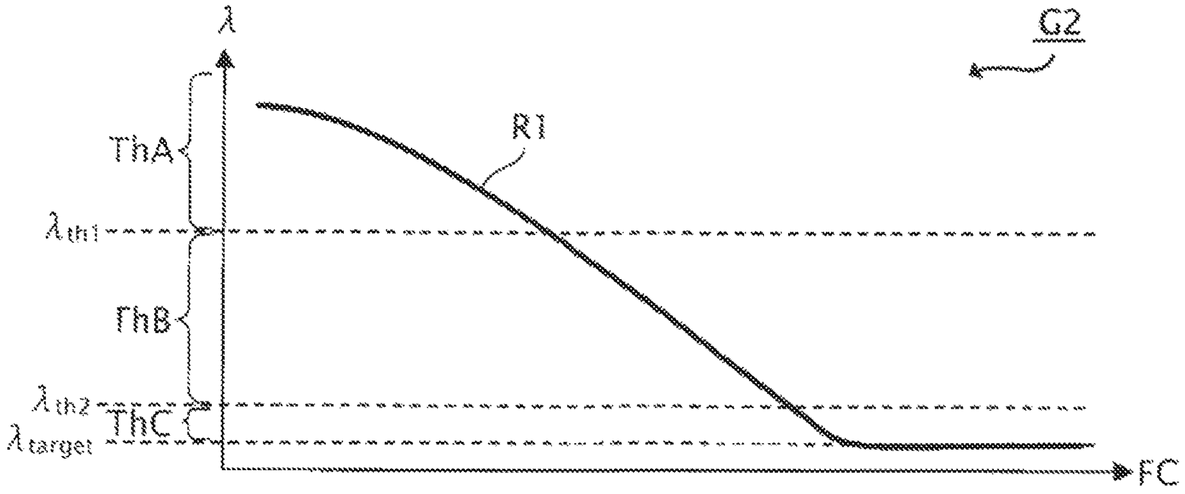
FIG. 12 is an explanatory view for describing a relationship between the attenuation factor λ and the number of shots FC.

FIG. 12 is an explanatory view for describing a relationship between the attenuation factor λ and the number of shots FC. The attenuation factor characteristic R1 shown in the graph G2 illustrated in FIG. 12 indicates the change in characteristic of the attenuation factor according to the number of shots FC. The horizontal axis of the graph G2 indicates the number of shots FC, and the vertical axis of the graph G2 indicates the attenuation factor λ. As indicated by the attenuation factor characteristic R1, the thickening state of the ink inside the discharging portion D is roughly classified into a thickening state ThA, a thickening state ThB, and a thickening state ThC. The attenuation factor threshold value $\lambda_{th1}$ illustrated in FIG. 12 indicates the boundary between the thickening state ThA and the thickening state ThB. The attenuation factor threshold value $\lambda_{th2}$ indicates the boundary between the thickening state ThB and the thickening state ThC. The target attenuation factor $\lambda_{target}$ indicates the attenuation factor that indicates a state in which the ink inside the discharging portion D is not thickened. A designer of the ink jet printer 1 sets in advance the attenuation factor λ in a state in which the printing quality does not deteriorate, which is obtained by experiments or experiences, as a target attenuation factor $\lambda_{target}$. The deterioration of the printing quality means that, for example, the deviation of ruled lines, uneven printing, or the like occurs. The thickening state ThA is a state in which the ink in an area extending from the inside of the nozzle N to the cavity 320 and reaching the reservoir 350 is thickened. The thickening state ThB is a state in which the ink from the inside of the nozzle N to the inside of cavity 320 is thickened, but the ink upstream of the cavity 320 is not thickened. The thickening state ThC is a state in which only the ink in the vicinity of the nozzle N is thickened.

In the thickening state ThA, even when the ink is discharged from the nozzle N to some extent, since the thickened ink upstream of the cavity 320 is supplied to the cavity 320, the thickening of the ink inside the discharging portion D is difficult to eliminate, and the degree to which the viscosity of the ink decreases tends to be low according to the discharging amount of the ink from the discharging portion D. In the thickening state ThB, since the ink upstream of the cavity 320 is not thickened, the viscosity of the ink inside the discharging portion D tends to decrease linearly according to the discharging amount of the ink from the discharging portion D. In the thickening state ThC, since only the ink in the vicinity of the nozzle is thickened, the viscosity of the ink inside the discharging portion D reaches the target attenuation factor $\lambda_{target}$ by discharging a small amount.

Although one attenuation factor characteristic R1 is shown in the graph G2, the actual attenuation factor characteristic of the discharging portion D is not always the attenuation factor characteristic R1. The reason why the actual attenuation factor characteristic of the discharging portion D is not always the attenuation factor characteristic R1 is that the degree of progress of thickening of the discharging portion D is different from each other depending on the state of the flow of the ink, a status of the discharging of the nozzle N, a variation of the diameter of the nozzle N, a position of the nozzle N, the temperature of the ink, the humidity of the ink, and the type of the ink. For example, a slope of the actual attenuation factor characteristic of the discharging portion D may be greater than a slope of the attenuation factor characteristic R1 or may be smaller than the slope of the attenuation factor characteristic R1. Further, the attenuation factor threshold value $\lambda_{th1}$ and the attenuation factor threshold value $\lambda_{th2}$ cannot be accurately specified.

Therefore, in the first embodiment, the ink jet printer 1 eliminates the thickening of the ink by executing the flushing process of the appropriate number of shots FC based on the attenuation factor λ. Specifically, the ink jet printer 1 executes the first process, the second process, the third process, the fourth process, the fifth process, and the sixth process described below for each of a plurality of discharging portions D as the thickening elimination process that eliminates the thickening of the ink in the discharging portion D by using the flushing process.

As the first process, the control portion 6 sets the plurality of discharging portions D[1] to D[m] as the determination target discharging portion D-H in order, causes the determination target discharging portion D-H to generate the residual vibration, and acquires the attenuation factors $\lambda_1$[1] to $\lambda_1$[m] from the measurement circuit 9.

As the second process, the ink jet printer 1 executes the flushing process for the number of defined shots $FC_{ini}$ with respect to the plurality of discharging portions D[1] to D[m]. The number of defined shots $FC_{ini}$ is an integer of 1 or more.

As the third process, the control portion 6 sets the plurality of discharging portions D[1] to D[m] as the determination target discharging portion D-H in order, causes the determination target discharging portion D-H to generate the residual vibration again, and acquires the attenuation factors $\lambda_2$[1] to $\lambda_2$[m] from the measurement circuit 9.

As the fourth process, the ink jet printer 1 executes the flushing process with respect to the plurality of discharging portions D[1] to D[m] for the number of execution shots $FC_R$[m] corresponding to the number of temporary shots $FC_{temp[i]}$[m] calculated based on the most recent two times of attenuation factors λ of each of the discharging portions D[m]. In the first time of the fourth process, the most recent two times of attenuation factors λ of the discharging portion D[m] are an attenuation factor $\lambda_1$[m] acquired by the first process and an attenuation factor $\lambda_2$[m] acquired by the third process.

As the fifth process, the control portion 6 sets the plurality of discharging portions D[1] to D[m] as the determination target discharging portion D-H in order, causes the determination target discharging portion D-H to generate the residual vibration again, and acquires the attenuation factors $\lambda_3$[1] to $\lambda_3$[m] from the measurement circuit 9.

As the sixth process, the control portion 6 determines whether or not the ink inside the plurality of discharging portions D[1] to D[m] are thickened based on the attenuation factor $\lambda_3$[1] to the attenuation factor $\lambda_3$[m]. For example, the control portion 6 determines whether the attenuation factor $\lambda_3$[1] to the attenuation factor $\lambda_3$[m] are equal to or less than the target attenuation factor $\lambda_{target}$. In the sixth process, when the attenuation factor $\lambda_3$[1] to the attenuation factor $\lambda_3$[m] are equal to or less than the attenuation factor $\lambda_{target}$ the control portion 6 determines that the thickening of the ink inside the plurality of discharging portions D[1] to D[m] are eliminated and ends the thickening elimination process.

On the other hand, in the sixth process, when any of the attenuation factor $\lambda_3$[1] to the attenuation factor $\lambda_3$[m] is greater than the target attenuation factor $\lambda_{target}$ the control portion 6 determines that the thickening of the ink inside the plurality of discharging portions D[1] to D[m] are not eliminated and repeats from the fourth process to the sixth process.

Hereinafter, for one or more i, the number of execution shots of the flushing process executed in the discharging portion D[m] by the i-th times of the fourth process may be referred to as the "number of execution shots $FC_{R[i]}$[m]".

Further, when the number of temporary shots $FC_{temp}$ calculated by the i-th times of the fourth process is referred to as the "number of temporary shots $FC_{temp[i]}$[m]" with respect to the discharging portion D[m].

Further, the attenuation factor $\lambda_3$ acquired by the i-th times of the fifth process with respect to the discharging portion D[m] may be referred to as an attenuation factor $\lambda_{3[i]}$[m].

Further, in the i-th times of the fourth process with respect to the discharging portion D[m], of the most recent two times of attenuation factors, the attenuation factor λ acquired in the past may be referred to as an "attenuation factor $\lambda_{old[i]}$[m]", and the attenuation factor λ acquired the most recently may be referred to as an "attenuation factor $\lambda_{new[i]}$[m]". In the first time of the fourth process in which i is 1, the "attenuation factor $\lambda_{old[i]}$[m]" of the discharging portion D[m] is the attenuation factor $\lambda_1$[m] acquired by the first process, and the "attenuation factor $\lambda_{new[1]}$[m]" is the attenuation factor $\lambda_2$[m] acquired by the third process. In the second time of the fourth process in which i is 2, the most recent two times of attenuation factors λ of the discharging portion D[m] are the attenuation factor $\lambda_2$[m] acquired by the first time of the third process from the attenuation factor $\lambda_{old[2]}$[m], and the attenuation factor $\lambda_3$[m] acquired by the first time of the fifth process from the attenuation factor $\lambda_{new[2]}$[m]. In the i-th times (i is third or subsequent times) of the fourth process, the most recent two times of attenuation factors λ of the discharging portion D[m] are the attenuation factor $\lambda_3$[m] acquired by the i–second times of the fifth process from the attenuation factor $\lambda_{old[i]}$[m] and the attenuation factor $\lambda_3$[m] acquired by the i–first times of the fifth process from the attenuation factor $\lambda_{new[i]}$[m].

Further, the number of execution shots $FC_R$ of the most recent flushing process of the discharging portion D[m] at the time of the i-th times of the fourth process may be referred to as "the number of most recent shots $FC_{recent[i]}$[m]". When i is 1, the number of most recent shots $FC_{recent[i]}$[m] of the discharging portion D[m] is the number of defined shots $FC_{ini}$, and when i is 2 or more, the number of most recent shots $FC_{recent[i]}$[m] of the discharging portion D[m] is the number of execution shots $FC_{R[i-1]}$[m].

In the i-th times of the fourth process with respect to the discharging portion D[m], the attenuation factor $\lambda_{old[i]}$[m] corresponds to "first viscosity information", the attenuation factor $\lambda_{new[i]}$[m] corresponds to "second viscosity information", and the attenuation factor $\lambda_{3[i]}$[m] in the i-th times of the fifth process with respect to the discharging portion D[m] corresponds to "third viscosity information". Further, in the second process, a value of the number of defined shots $FC_{ini}$ or a value of the amount obtained by multiplying the unit amount of flushing by the number of defined shots $FC_{ini}$ corresponds to a "first amount". Hereinafter, the amount obtained by multiplying the unit amount of flushing by the number of defined shots $FC_{ini}$ may be referred to as an "amount of defined flushing". In the i-th times of the fourth process with respect to the discharging portion D[m], the value of the number of execution shots $FC_{R[i]}$[m], or the amount obtained by multiplying the unit amount of flushing by the number of execution shots $Fc_{R[i]}$[m] corresponds to a "second amount". The target attenuation factor $\lambda_{target}$ corresponds to the "target viscosity information".

The amount of defined flushing is less than the volume of the flow path of the discharging portion D. The volume of the flow path of the discharging portion D is the total of the volume inside the nozzle N and the volume inside the cavity 320. Alternatively, the amount of defined flushing may be less than the amount of the ink that fills the flow path from the nozzle N to the ink supply port 360. The designer of the ink jet printer 1 sets a value obtained by dividing the unit amount of flushing from the amount obtained by multiplying the volume of the flow path of the discharging portion D by a value, which is greater than 0 and less than 1, as the number of defined shots $FC_{ini}$. In a case where the number of defined shots $FC_{ini}$ is set too large, there is a possibility that the ink is excessively discharged when the thickening state of the ink inside the discharging portion D is the thickening state ThC. On the other hand, in a case where the number of defined shots $FC_{ini}$ is set too small, the attenuation factor λ1 and the attenuation factor $\lambda_2$ become close to each other, and the error mixed in the number of temporary shots $FC_{temp[i]}$ calculated by the fourth process in the thickening elimination process becomes large. In order to reduce the error mixed in the number of temporary shots $FC_{temp[i]}$ calculated by the fourth process, the number of defined shots $FC_{ini}$ is preferably set to such a number that the attenuation factor λ1 and the attenuation factor $\lambda_2$ are separated to some extent.

The i-th times (i is 1 or more) of the fourth process will be described more specifically. The control portion 6 determines the number of execution shots $FC_{R[i]}$ based on the attenuation factor $\lambda_{old[i]}$ the attenuation factor $\lambda_{new[i]}$, and the target attenuation factor $\lambda_{target}$. More specifically, the control portion 6 calculates the number of temporary shots $FC_{temp[i]}$ by using the following equation (6), determines the number of temporary shots $FC_{temp[i]}$ as the number of execution shots $FC_{R[i]}$ when the number of temporary shots $FC_{temp[i]}$ is less than the number of maximum shots $FC_{max}$, and determines the number of maximum shots $FC_{max}$ as the number of execution shots $FC_{R[i]}$ when the number of temporary shots $FC_{temp[i]}$ is equal to or greater than the number of maximum shots $FC_{max}$.

$$FC_{temp\ [i]} = \frac{\lambda_{new\ [i]} - \lambda_{target}}{\lambda_{old\ [i]} - \lambda_{new\ [i]}} \times FC_{recent\ [i]} \quad (6)$$

The number of maximum shots $FC_{max}$ is used to reduce the excessive discharging of the ink. When the number of maximum shots $FC_{max}$, is large, the period required for the thickening elimination process using the residual vibration can be shortened, but the possibility of the excessive discharging of the ink increases. On the other hand, when the number of maximum shots $FC_{max}$ is small, the period required for the thickening elimination process using the residual vibration becomes long, but the possibility of the excessive discharging of the ink can be reduced. The designer of the ink jet printer 1 may set in advance, for example, the number of maximum shots $FC_{max}$ according to the maximum allowable period allowed for the thickening elimination process. The number of maximum shots $FC_{max}$ is greater than the number of defined shots $FC_{ini}$. In other words, the number of defined shots $FC_{ini}$ is less than the number of maximum shots $FC_{max}$.

In the i-th times of the fourth process with respect to the discharging portion D[m], the value of the number of temporary shots $FC_{temp[i]}$[m], or the value of the amount obtained by multiplying the unit amount of flushing by the number of temporary shots $FC_{temp[i]}$ corresponds to a "third amount". In the equation (6), the value obtained by subtracting the attenuation factor $\lambda_{target}$ from the attenuation factor $\lambda_{new[i]}$ corresponds to a "difference value between the second viscosity information and the target viscosity information" and corresponds to a "first value". Further, in the equation (6), the value obtained by subtracting the attenuation factor $\lambda_{new[i]}$ from the attenuation factor $\lambda_{old[i]}$ corresponds to a "difference value between the first viscosity information and the second viscosity information" and corresponds to a "second value". In the equation (6), a value obtained by dividing the value, which is obtained by subtracting the attenuation factor $\lambda_{target}$ from the attenuation factor $\lambda_{new[i]}$, by the value, which is obtained by subtracting the attenuation factor $\lambda_{new[i]}$ from the attenuation factor $\lambda_{old[i]}$, corresponds to a "value obtained by dividing the first value by the second value". The value of the number of maximum shots $FC_{max}$ or the value obtained by multiplying the unit amount of flushing by the number of maximum shots $FC_{max}$ corresponds to a "specific maximum discharging amount".

An example of determining the number of execution shots $FC_{R[1]}$[m] in the first time of the fourth process with respect to the discharging portion D[m] will be described with reference to FIG. 13, and an example of determining the number of execution shots $FC_{R[i]}$[m] in the i-th times (i is 2 or more) of the fourth process with respect to the discharging portion D[m] will be described with reference to FIG. 14.

Figure 13:
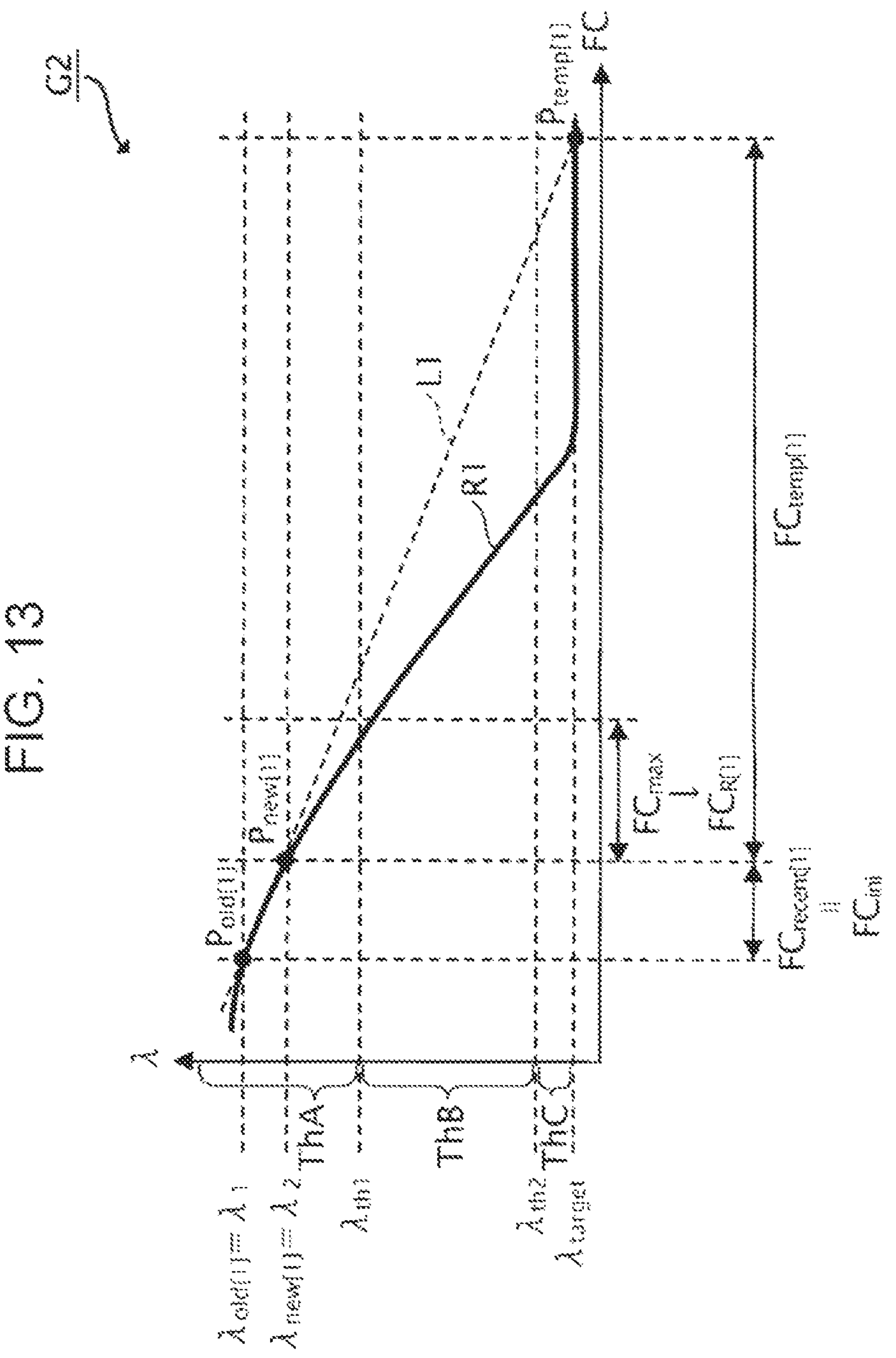
FIG. 13 is an explanatory view for describing an example of determining the number of execution shots $FC_{R[1]}$ in the first time of a fourth process.

FIG. 13 is an explanatory view for describing an example of determining the number of execution shots $FC_{R[1]}$[m] in the first time of the fourth process with respect to the discharging portion D[m]. In the example in FIG. 13, the thickening state of the attenuation factor $\lambda_1$[m] and the thickening state of the attenuation factor $\lambda_2$[m] are included in the thickening state ThA. However, the control portion 6 does not determine which thickening state Th includes the thickening state of the attenuation factor $\lambda_1$[m] and the thickening state of the attenuation factor $\lambda_2$[m] among the thickening state ThA, the thickening state ThB, and the thickening state ThC.

In the first time of the fourth process with respect to the discharging portion D[m], the control portion 6 calculates the number of temporary shots $FC_{temp[1]}$[m] by substituting the attenuation factor $\lambda_{old[1]}$[m] (attenuation factor $\lambda_1$[m]), the attenuation factor $\lambda_{new[1]}$[m] (attenuation factor $\lambda_2$[m]), the target attenuation factor $\lambda_{target}$, and the number of most recent shots $FC_{recent[i]}$[m] (the number of defined shots $FC_{ini}$) into the equation (6). As illustrated in FIG. 13, a straight line L1 passing through a point $P_{old[1]}$ the attenuation factor $\lambda_{old[1]}$[m] (attenuation factor $\lambda_1$[m]) to the attenuation factor $\lambda_{new[1]}$[m] (attenuation factor $\lambda_2$[m]) by performing discharge of the ink for the number of defined shots $FC_{ini}$ from the discharging portion D[m] is a proportional relationship. Further, in the proportional relationship, the number of temporary shots $FC_{temp[i]}$[m] corresponding to the discharging amount of the ink from the discharging portion D[m] required to change from the attenuation factor $\lambda_2$[m] to the target attenuation factor $\lambda_{target}$ is the number of shots FC, which is on the straight line L1 in the graph G2 and corresponds to the change from the point $P_{new[1]}$ to the point $P_{temp[1]}$. When the number of shots FC, which is the number of times the ink is discharged from the discharging portion D[m], and the accompanying change in attenuation factor $\lambda$ of the ink inside the discharging portion D are observed, in experiments or simulations, the relationship between the attenuation factor $\lambda$ and the number of shots FC is indicated by the attenuation factor characteristic R1. As can be seen from the graph G2 illustrated in FIG. 13, the number of temporary shots $FC_{temp[1]}$[m], which corresponds to the discharging amount of the ink from the discharging portion D[m] required to change from the attenuation factor $\lambda_2$[m] to the target attenuation factor $\lambda_{target}$ obtained by using the equation (6), is excessively more than the number of shots, which corresponds to the discharging amount of the ink from the discharging portion D required to change from the attenuation factor $\lambda_2$[m] to the target attenuation factor $\lambda_{target}$ in the attenuation factor characteristic R1. This is because the attenuation factor characteristic R1 includes the thickening state ThA, the thickening state ThB, and the thickening state ThC, in which the change in attenuation factor $\lambda$ with respect to the number of shots FC does not indicate a constant proportional relationship throughout and the change rates are different.

As illustrated in FIG. 13, in the thickening state ThA, since it can be said that the degree to which the viscosity of the ink decreases according to the discharging amount of the ink from the discharging portion D is lower than that in the thickening state ThB, when the ink jet printer 1, which measures the attenuation factor $\lambda_1$[m] and the attenuation factor $\lambda_2$[m] at the discharging portion D in which the ink is in the thickening state ThA, executes the flushing process for the number of temporary shots $FC_{temp[i]}$[m] calculated by using the equation (6), the ink is discharged excessively.

Therefore, in the example in FIG. 13, since the number of temporary shots $FC_{temp[i]}$[m] is equal to or greater than the number of maximum shots $FC_{max}$, the control portion 6 determines the number of maximum shots $FC_{max}$ as the number of execution shots $FC_{R[i]}$[m]. As described above, the number of maximum shots $FC_{max}$ is used to reduce the excessive discharging of the ink.

Figure 14:
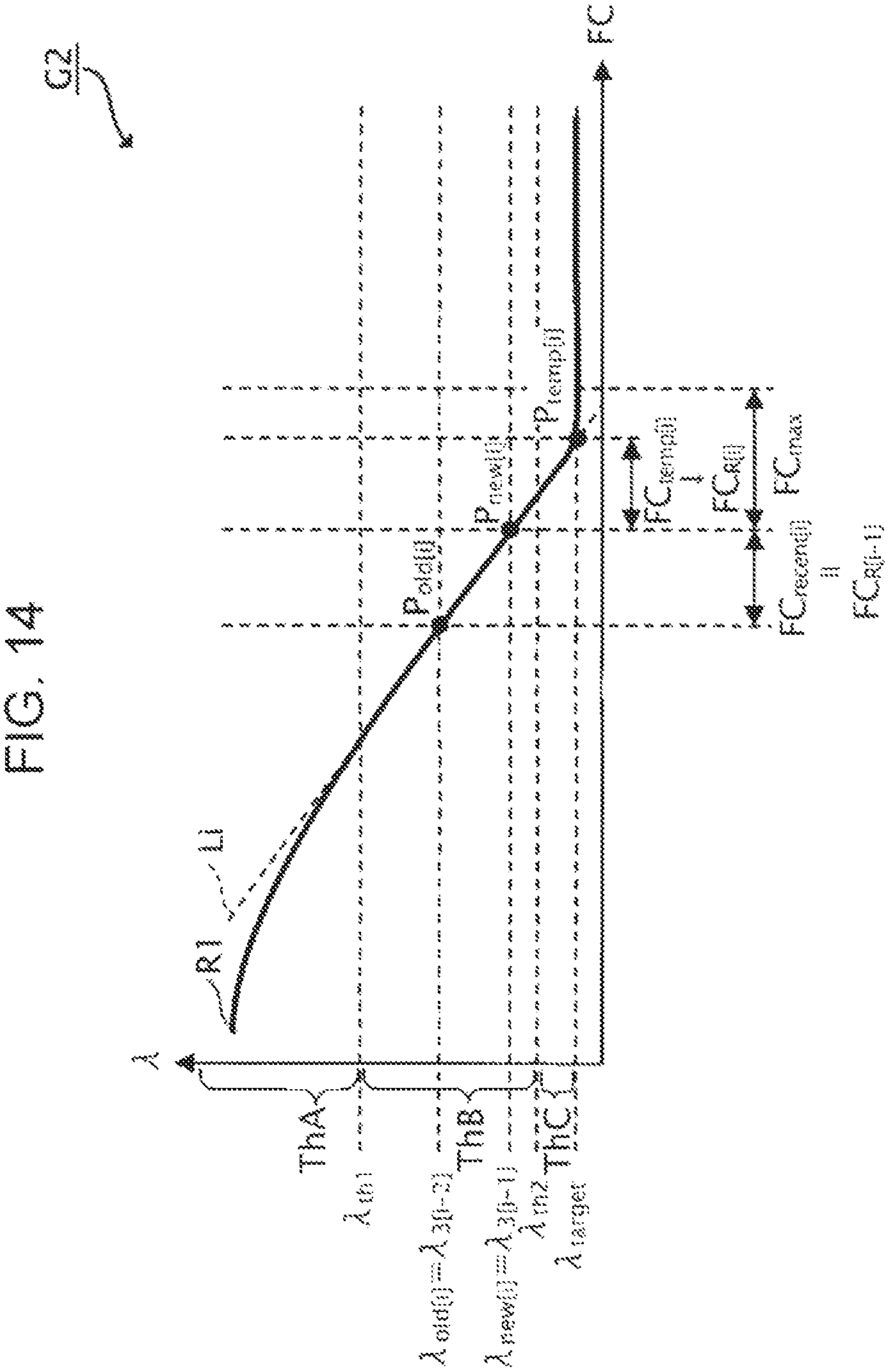
FIG. 14 is an explanatory view for describing an example of determining the number of execution shots $FC_{R[1]}$ in the i-th times (i is 3 or more) of the fourth process.

FIG. 14 is an explanatory view for describing an example of determining the number of execution shots $FC_{R[i]}$[m] in the i-th times (i is 3 or more) of the fourth process with respect to the discharging portion D[m] in which the viscosity state of the ink is the thickening state ThB. In the i-th times of the fourth process, the control portion 6 calculates the number of temporary shots $FC_{temp[i]}$ by substituting the attenuation factor $\lambda_{old[i]}$[m] (attenuation factor $\lambda_{3[i-2]}$[m]), the attenuation factor $\lambda_{new[i]}$[m] (attenuation factor $\lambda_{3[i-1]}$[m]), the target attenuation factor $\lambda_{target}$, and the number of most recent shots $FC_{recent[i]}$[m] (the number of execution shots $FC_{R[i-]}$[m]) into the equation (6). As illustrated in FIG. 14, a straight line Li passing through a point $P_{old[i]}$ and a point $P_{new[i]}$ is drawn by assuming that the change from the attenuation factor $\lambda_{old[i]}$ to the attenuation factor $\lambda_{new[i]}$ by performing discharge of the ink for the number of most recent shots $FC_{recent[i]}$ from the discharging portion D[m] is a proportional relationship. Further, in the proportional relationship, the number of temporary shots $FC_{temp[i]}$[m] corresponding to the discharging amount of the ink from the discharging portion D[m] required to change from the attenuation factor $\lambda_{new[i]}$[m] to the target attenuation factor $\lambda_{target}$ is the number of shots FC, which is on the straight line Li in the graph G2 and corresponds to the change from the point $P_{new[i]}$ to the point $P_{temp[i]}$. As described above, when the number of shots FC, which is the number of times the ink is discharged from the discharging portion D[m], and the accompanying change in attenuation factor λ are obtained, in experiments or simulations, the relationship between the attenuation factor λ and the number of shots FC is indicated by the attenuation factor characteristic R1. As can be seen from the graph G2 illustrated in FIG. 14, the number of temporary shots $FC_{temp[i]}$[m], which corresponds to the discharging amount of the ink from the discharging portion D[m] required to change from the attenuation factor $\lambda_{old[i]}$ to the target attenuation factor $\lambda_{target}$ obtained by using the equation (6), is the same as the number of shots, which corresponds to the discharging amount of the ink from the discharging portion D[m] required to change from the attenuation factor $\lambda_{old[i]}$ to the target attenuation factor $\lambda_{target}$ in the attenuation factor characteristic R1. This is because the attenuation factor characteristic R1 includes the thickening state ThA, the thickening state ThB, and the thickening state ThC, in which the change in attenuation factor λ with respect to the number of shots FC does not indicate a constant proportional relationship throughout and the change rates are different. Further, when the ink jet printer 1 executes the flushing process for the number of temporary shots $FC_{temp[i]}$[m] calculated by using the equation (6) using the attenuation factor λ acquired when the viscosity state of the ink inside the discharging portion D[m] is the thickening state ThB, it is possible to discharge an appropriate amount of ink in just proportion to eliminate the thickening of the ink inside the discharging portion D[m].

In the example in FIG. 14, since the number of temporary shots $FC_{temp[i]}$[m] is less than the number of maximum shots $FC_{max}$, the control portion 6 determines the number of temporary shots $FC_{temp[i]}$ as the number of execution shots $FC_{R[i]}$[m].

1.6. Execution Timing of Flushing Process

Next, the execution timing of the flushing process will be described with reference to FIG. 15.

Figure 15:
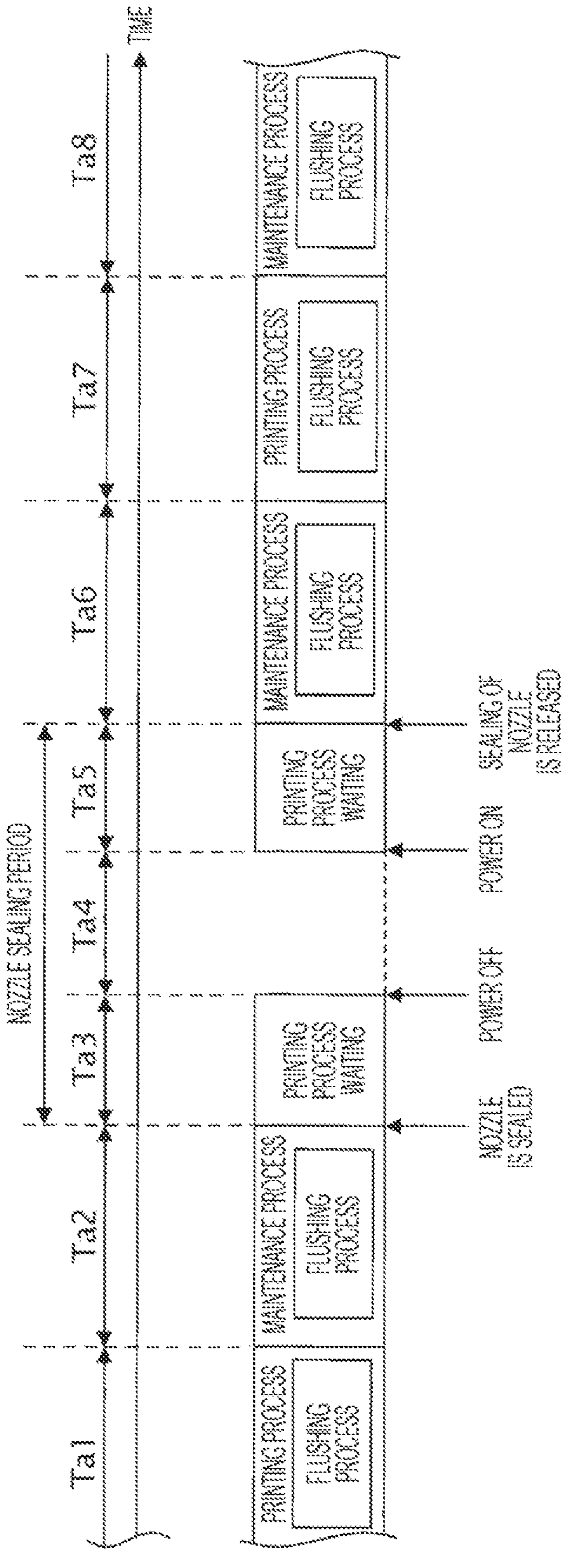
FIG. 15 is an explanatory view for describing a series of operations of the ink jet printer 1.

FIG. 15 is an explanatory view for describing a series of operations of the ink jet printer 1.

When the power is turned on in response to a user's operation, the ink jet printer 1 waits for the supply of the print data Img (period Ta5 illustrated in FIG. 15). When the print data Img is supplied during the printing process waiting period (period Ta5 illustrated in FIG. 15), the maintenance process before the printing process (period Ta6 illustrated in FIG. 15) is executed. In the period of the maintenance process (period Ta6 illustrated in FIG. 15) before the printing process, the ink jet printer 1 releases the sealing of the nozzle N by the cap 42 and executes the flushing process.

When the maintenance process before the printing process (period Ta6 illustrated in FIG. 15) is ended, the ink jet printer 1 executes the printing process of forming the image indicated by the print data Img supplied from the host computer on the recording paper P (period Ta1 and period Ta1 illustrated in FIG. 15). During the printing process, the ink jet printer 1 executes the flushing process when a process, in which the head unit HU moves from one end to the other end in the X-axis direction and returns to one end, is repeated a certain number of times or periodically. The number of shots FC of the flushing process during the printing process is, for example, a number predetermined times set in advance or the number of times corresponding to the number of droplets discharged from the nozzle N after the immediately preceding flushing process.

In the period after the execution of the printing process is ended and before the nozzle N is covered with the cap 42 (period Tat and period Ta8 illustrated in FIG. 15), the maintenance process after the printing process is executed. In the maintenance process after the execution of the printing process is ended, the ink jet printer 1 executes the flushing process. After the execution of the maintenance process after the printing process is ended, the ink jet printer 1 covers the nozzle N with the cap 42. After the nozzle N is sealed, the ink jet printer 1 waits for the supply of print data Img from the host computer (period Ta3 illustrated in FIG. 15). Although not illustrated in FIG. 15, when the print data Img is supplied during the printing process waiting period Ta3, the maintenance process before the printing process is executed in the same manner as the above-mentioned period Ta6 at the end of the period Ta3 and in a period (not illustrated) following the period Ta3. As illustrated in FIG. 15, when the power is turned off during the printing process waiting period Ta3, the ink jet printer 1 is suspended. The power of the ink jet printer 1 may be turned off in response to the operation of the user of the ink jet printer 1, and the control portion 6 may measure the printing process waiting continuation period during which the print data Img is not supplied and automatically turn off the power of the ink jet printer 1 based on the measured printing process waiting continuation period.

As illustrated in FIG. 15, the nozzle N is sealed by the cap 42 from the start of the period Ta3 in which the nozzle N after executing the maintenance process after the printing process is sealed by the cap 42 to the start of the period Ta6 when the print data Img is supplied next. The period during which a state where the nozzle N is sealed by the cap 42 is maintained may be referred to as a "nozzle sealing period".

1.7. Maintenance Process

The processing contents of the maintenance process before the printing process that is executed before the printing process after the print data Img is supplied, and the maintenance process after the printing process that is executed after the printing process is ended and before the nozzle N is sealed by the cap 42 will be described with reference to FIG. 16.

Figure 16:
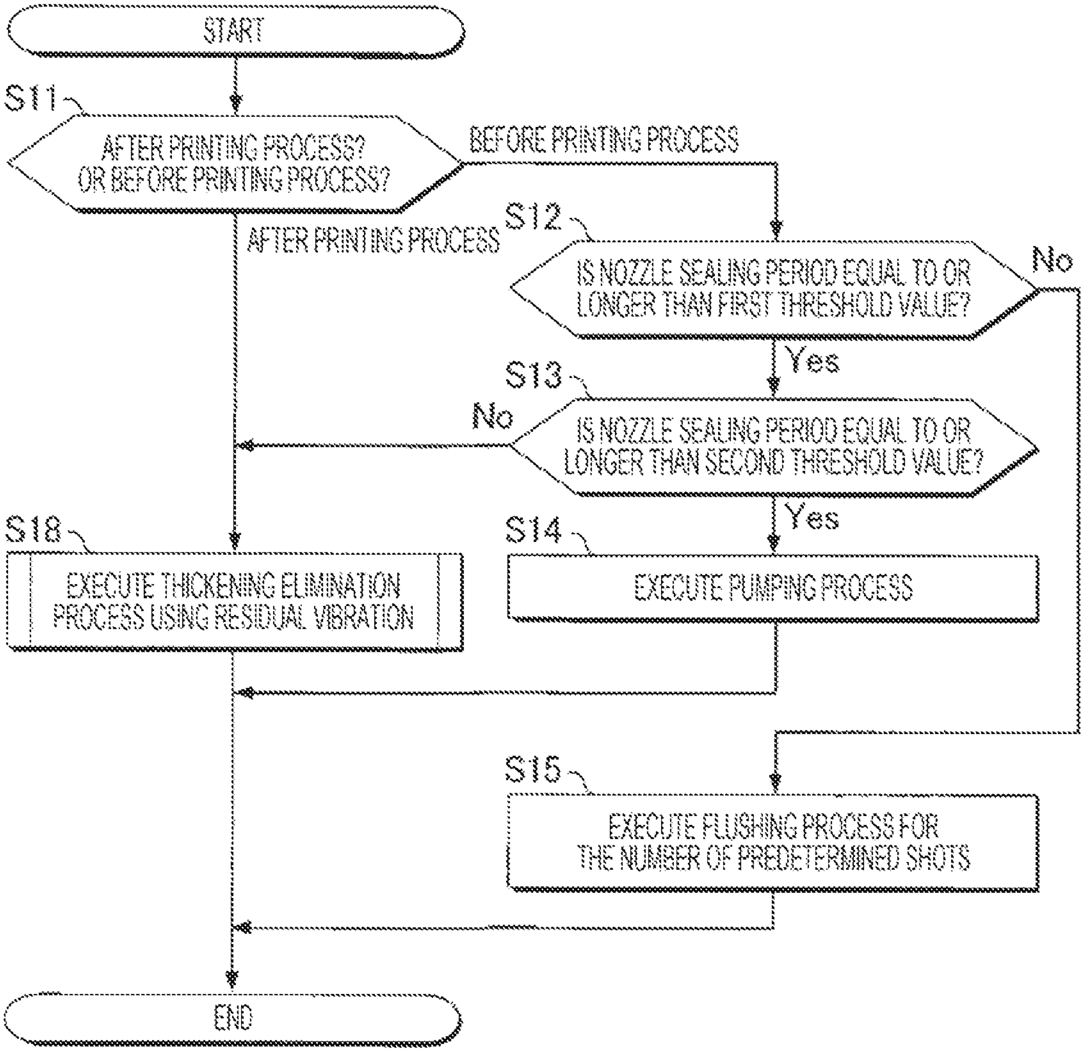
FIG. 16 is a view illustrating a flowchart illustrating a maintenance process.

FIG. 16 is a flowchart illustrating the maintenance process before the printing process that is executed before the printing process after the print data Img is supplied, and the maintenance process after the printing process that is executed after the printing process is ended and before the nozzle N is sealed by the cap 42.

In step S11, the control portion 6 determines whether the maintenance process currently being executed is the maintenance process after the printing process or the maintenance process before the printing process. When the maintenance process currently being executed is the maintenance process before the printing process, the control portion 6 advances the process to step S12. On the other hand, when the maintenance process currently being executed is the maintenance process after the printing process, the control portion 6 advances the process to step S18.

In step S12, the control portion 6 determines whether or not the "nozzle sealing period", which is the period during which a state where the nozzle N is sealed by the cap 42 is maintained, is equal to or longer than a first threshold value. The first threshold value can be set to a period corresponding to the nozzle sealing period in which only the ink in the vicinity of the nozzle N begins to thicken in the discharging portion D.

When the nozzle sealing period is not equal to or longer than the first threshold value, a negative determination is made in step S12, and the control portion 6 advances the process to step S15. When the nozzle sealing period is less than the first threshold value and the maintenance process currently being executed is executed before the printing process, in step S15, the ink jet printer 1 executes the flushing process with respect to all the discharging portions D used for the printing process for the number of predetermined shots and ends the maintenance process illustrated in FIG. 16. When the nozzle sealing period is less than the first threshold value and the maintenance process currently being executed is executed before the printing process, by simultaneously executing the flushing process for all the discharging portions D used in the printing process for the number of predetermined shots, the residual vibration is generated for each discharging portion D described later, and it is not necessary to calculate the number of shots of the flushing process suitable for each discharging portion D. Therefore, the ink jet printer 1 can shorten the period from the time when the print data Img is supplied to the ink jet printer 1 to the completion of the printing process by the user's operation.

On the other hand, when the nozzle sealing period is equal to or longer than the first threshold value, a positive determination is made in step S12, and the control portion 6 advances the process to step S13.

In step S13, the control portion 6 determines whether or not the "nozzle sealing period", which is the period during which a state where the nozzle N is sealed by the cap 42 is maintained, is equal to or longer than a second threshold value. The second threshold value can be set to a period corresponding to the nozzle sealing period in which the thickening of the ink inside the discharging portion D progresses and it becomes difficult to discharge the ink inside the discharging portion D from the nozzle N due to the displacement of the piezoelectric element PZ.

In step S13, when the nozzle sealing period is equal to or longer than the second threshold value, the process proceeds to step S14, and the ink jet printer 1 executes a pumping process of sucking the ink inside the discharging portion D by the tube pump and ends the maintenance process illustrated in FIG. 16.

On the other hand, when the nozzle sealing period is not equal to or longer than the second threshold value, a negative determination is made in step S12, and the control portion 6 advances the process to step S18.

Figure 17:
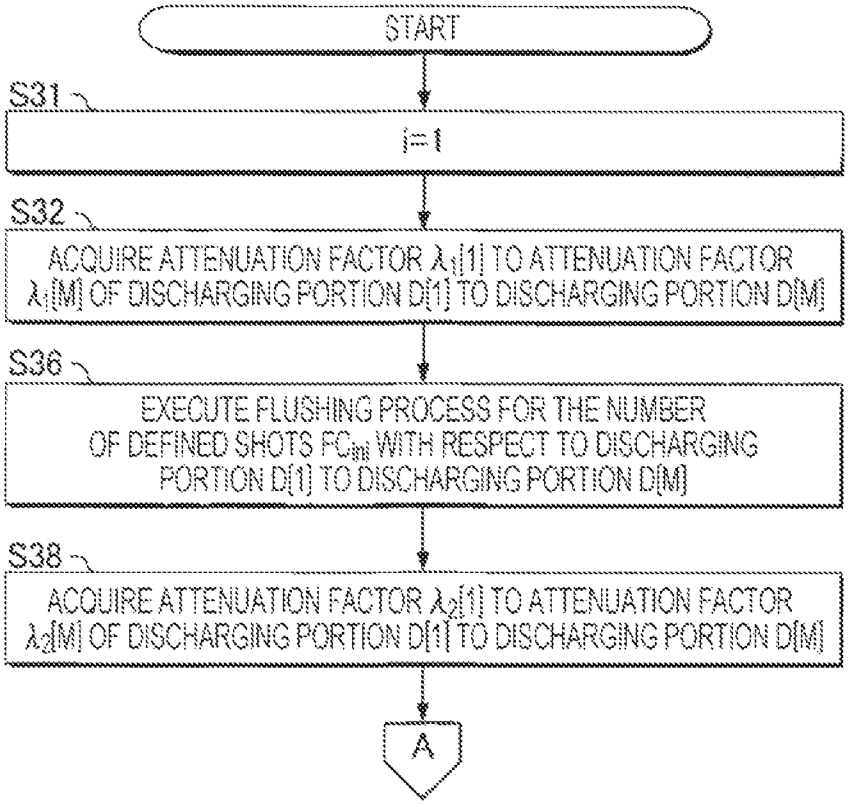
FIG. 17 is a view illustrating a flowchart illustrating a thickening elimination process using residual vibration.
Figure 18:
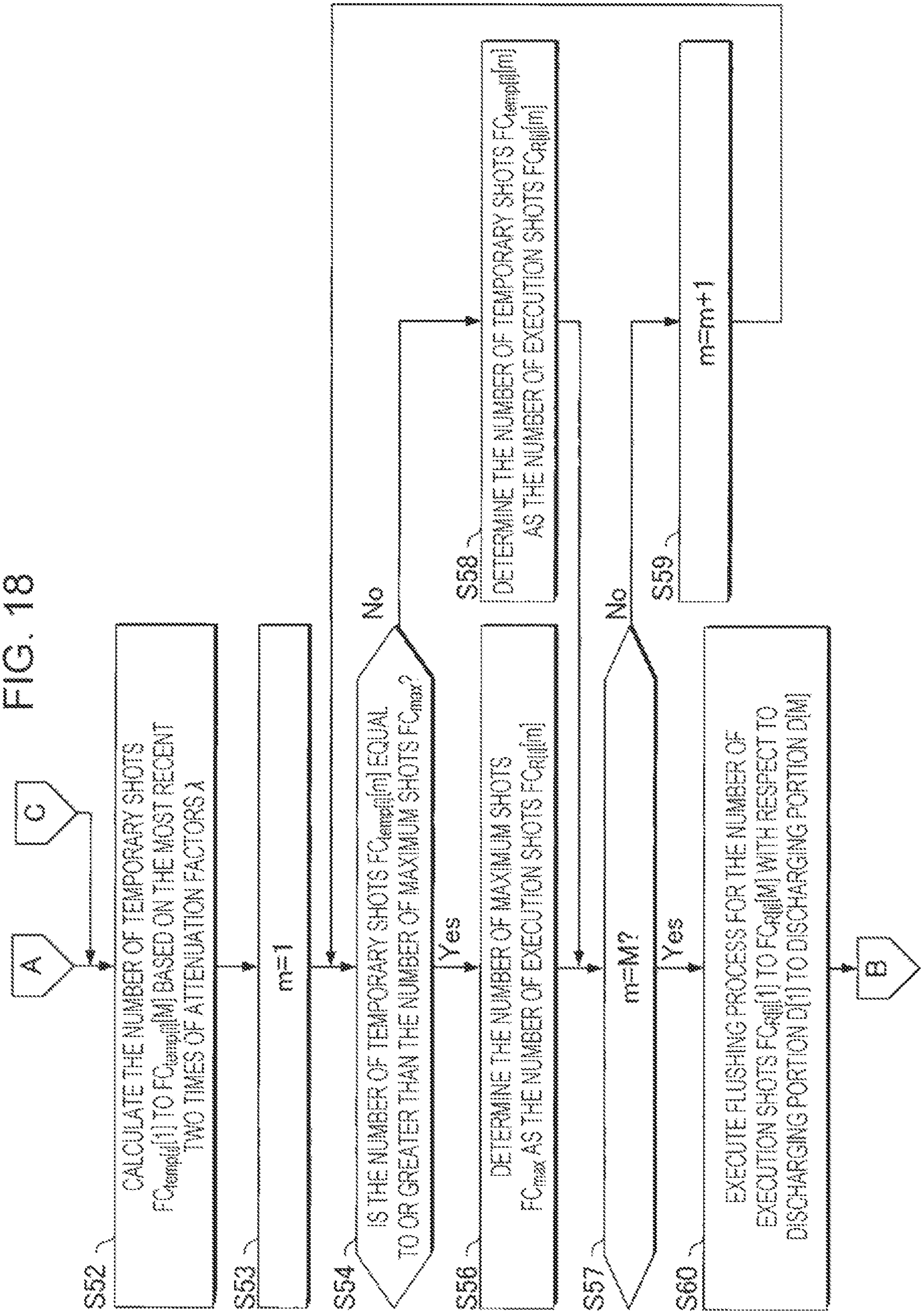
FIG. 18 is a view illustrating a flowchart illustrating the thickening elimination process using the residual vibration.
Figure 19:
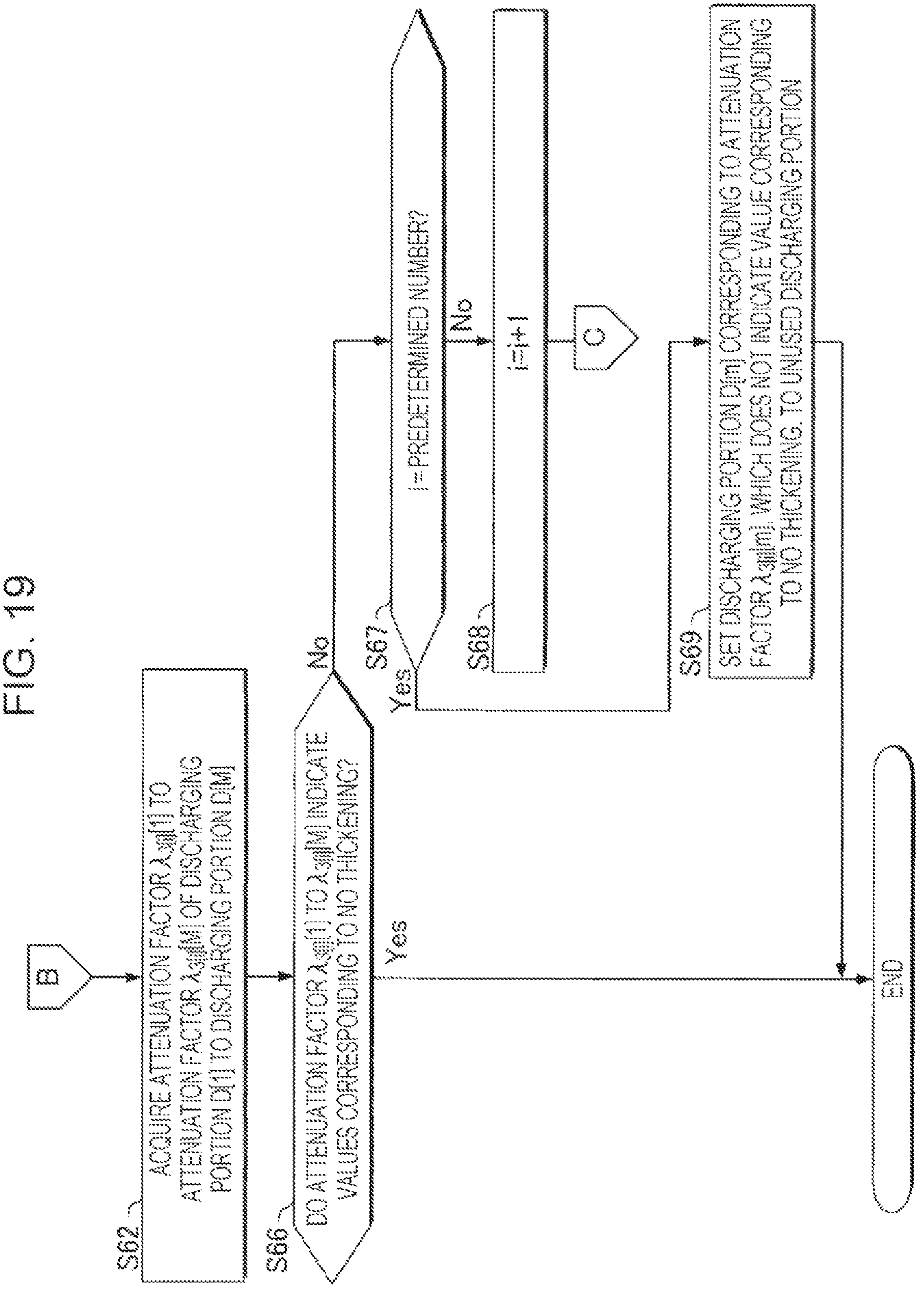
FIG. 19 is a view illustrating a flowchart illustrating the thickening elimination process using the residual vibration.

In step S18, the thickening elimination process using the residual vibration information that is illustrated in FIGS. 17, 18, and 19 is executed.

FIGS. 17, 18, and 19 are flowcharts illustrating the thickening elimination process using the residual vibration.

In step S31, the control portion 6 substitutes 1 for the variable i.

In step S32, the control portion 6 sets the discharging portion D[1] to the discharging portion D[m] in order as the determination target discharging portion D-H, acquires the attenuation factor $\lambda_1$, and stores the attenuation factor $\lambda_1$[1] to the attenuation factor $\lambda_1$[M] corresponding to one-to-one with the discharging portion D[1] to the discharging portion D[M] to the storage portion 5 as the attenuation factor $\lambda_{old[i]}$[1] to the attenuation factor $\lambda_{old[i]}$[M]. The process in step S32 corresponds to the first process of the thickening elimination process using the residual vibration.

After the attenuation factor λ1 is acquired, the ink jet printer 1 executes the flushing process with respect to the discharging portion D[1] to the discharging portion D[M] for the number of defined shots $FC_{ini}$ in step S36. The control portion 6 stores the number of defined shots $FC_{ini}$ in the storage portion 5 as the number of most recent shots $FC_{recent[i]}$[1] to the number of most recent shots $FC_{recent[i]}$[M]. The process in step S36 corresponds to the second process of the thickening elimination process using the residual vibration.

After the flushing process is executed for the number of defined shots $FC_{ini}$, in step S38, the control portion 6 sets the discharging portion D[1] to the discharging portion D[M] in order as the determination target discharging portion D-H, acquires the attenuation factor $\lambda_2$[1] to the attenuation factor $\lambda_2$[M], and stores the attenuation factor $\lambda_2$[1] to the attenuation factor $\lambda_2$[M] corresponding to the discharging portion D[1] to the discharging portion D[M] to the storage portion 5 as the attenuation factor $\lambda_{new[i]}$[1] to the attenuation factor $\lambda_{new[i]}$[M]. The process in step S38 corresponds to the third process of the thickening elimination process using the residual vibration.

After the process in step S38 is ended, in step S52, the control portion 6 calculates the number of temporary shots $FC_{temp[i]}$[1] to the number of temporary shots $FC_{temp[i]}$[M] based on the most recent two times of attenuation factors λ of each of the discharging portion D[1] to the discharging portion D[M]. Specifically, in each of the discharging portion D[1] to the discharging portion D[M], based on the attenuation factor $\lambda_{old[i]}$[M], the attenuation factor $\lambda_{new[i]}$[M], the number of most recent shots $FC_{recent[i]}$[M], which correspond to the discharging portion D[M], the target attenuation factor $\lambda_{target}$, and the equation (6), the control portion 6 calculates the number of temporary shots $FC_{temp[i]}$[M] and stores the number of temporary shots $FC_{temp[i]}$[1] to the number of temporary shots $FC_{temp[i]}$[M], which are the calculation results, in the storage portion 5.

After the process in step S52 is ended, the control portion 6 substitutes 1 for the variable m in step S53.

After the process in step S53 is ended, in step S54, the control portion 6 determines whether or not the number of temporary shots $FC_{temp[i]}$[M] is equal to or greater than the number of maximum shots $FC_{max}$.

When the determination result in step S54 is positive, in step S56, the control portion 6 determines the number of maximum shots $FC_{max}$ as the number of execution shots $FC_{R[i]}$[M] and stores the number of execution shots $FC_{R[i]}$[M] in the storage portion 5.

On the other hand, when the determination result in step S54 is negative, in step S58, the control portion 6 determines the number of temporary shots $FC_{temp[i]}$[m] as the number of execution shots $FC_{R[i]}$[M] and stores the number of execution shots $FC_{R[i]}$[M] in the storage portion 5.

After the process in step S56 is ended or after the process in step S58 is ended, in step S57, the control portion 6 determines whether or not the variable m reached the value M.

When the determination result in step S57 is negative, the process proceeds to step S59, the control portion 6 increases the value of the variable m by one and returns the process to step S54.

On the other hand, when the determination result in step S57 is positive, that is, the number of execution shots $FC_{R[i]}$[1] to the number of execution shots $FC_{R[i]}$[M], which correspond to the discharging portion D[1] to the discharging portion D[M], are determined, the control portion 6 advances the process to step S60.

In step S60, the control portion 6 executes the flushing process with respect to the discharging portion D[1] to the discharging portion D[M] for the corresponding number of execution shots $FC_{R[i]}$[1] to the number of execution shots $FC_{R[i]}$[M], respectively.

The processes of step S52, step S53, step S54, step S56, step S57, step S58, step S59, and step S60 correspond to the fourth process of the thickening elimination process using the residual vibration.

After the process in step S60 is ended, in step S62, the control portion 6 sets the discharging portion D[1] to the discharging portion D[M] as the determination target discharging portion D-H in order, acquires the attenuation factor $\lambda_{3[i]}$[1] to the attenuation factor $\lambda_{3[i]}$[M] corresponding to the discharging portion D[1] to the discharging portion D[M], and stores the acquired results to the storage portion 5. The process in step S62 corresponds to the fifth process of the thickening elimination process using the residual vibration.

After the process in step S62 is ended, in step S66, the control portion 6 determines whether or not the attenuation factor $\lambda_{3[i]}$[1] to the attenuation factor $\lambda_{3[i]}$[M] indicate values corresponding to no thickening.

Specifically, the control portion 6 determines whether or not the attenuation factor $\lambda_{3[i]}$[1] to the attenuation factor $\lambda_{3[i]}$[M] are equal to or less than the target attenuation factor $\lambda_{target}$. The process in step S66 corresponds to the sixth process of the thickening elimination process using the residual vibration.

When the determination result in step S66 is positive, for example, when the attenuation factor $\lambda_{3[i]}$[1] to the attenuation factor $\lambda_{3[i]}$[M] are equal to or less than the target attenuation factor $\lambda_{target}$ the ink jet printer 1 ends the series of processes illustrated in FIGS. 17, 18, and 19.

On the other hand, when the determination result in step S66 is negative, for example, when any of the attenuation factor $\lambda_{3[i]}$[1] to the attenuation factor $\lambda_{3[i]}$[M] is greater than the target attenuation factor $\lambda_{target}$, in step S67, the control portion 6 determines whether or not the variable i reached a predetermined number. The predetermined number is a natural number of 2 or more and defines the number of repetitions of the fourth process.

When the variable i does not reach the predetermined number, in step S68, the control portion 6 increases the value of the variable i by one, stores the attenuation factor $\lambda_{new[i-1]}$[1] to the attenuation factor $\lambda_{new[i-1]}$[M] to the storage portion 5 as the attenuation factor $\lambda_{old[i]}$[1] in the attenuation factor $\lambda_{old[i]}$[M], stores the attenuation factor $\lambda_{3[1]}$[1] to the attenuation factor $\lambda_{3[i]}$[M] in the storage portion 5 as the attenuation factor $\lambda_{new[i]}$[1] to the attenuation factor $\lambda_{new[i]}$[M] and returns the process to step S52.

On the other hand, when the determination result in step S67 is positive, in step S69, among the attenuation factor $\lambda_{3[1]}$[1] to the attenuation factor $\lambda_{3[i]}$[M], the control portion 6 sets the discharging portion D[M] corresponding to the attenuation factor $\lambda_{3[i]}$[M], which does not indicate a value corresponding to no thickening, to the unused discharging portion that is not used during printing, and the ink jet printer 1 ends the series of processes illustrated in FIGS. 17, 18, and 19.

Next, with reference to FIG. 20, the processing contents of the maintenance process according to the discharge abnormality of the discharging portion D will be described. The maintenance process according to the discharge abnormality of the discharging portion D can be performed when an instruction is received from the user or when a preset operating condition of the ink jet printer 1 is detected.

Figure 20:
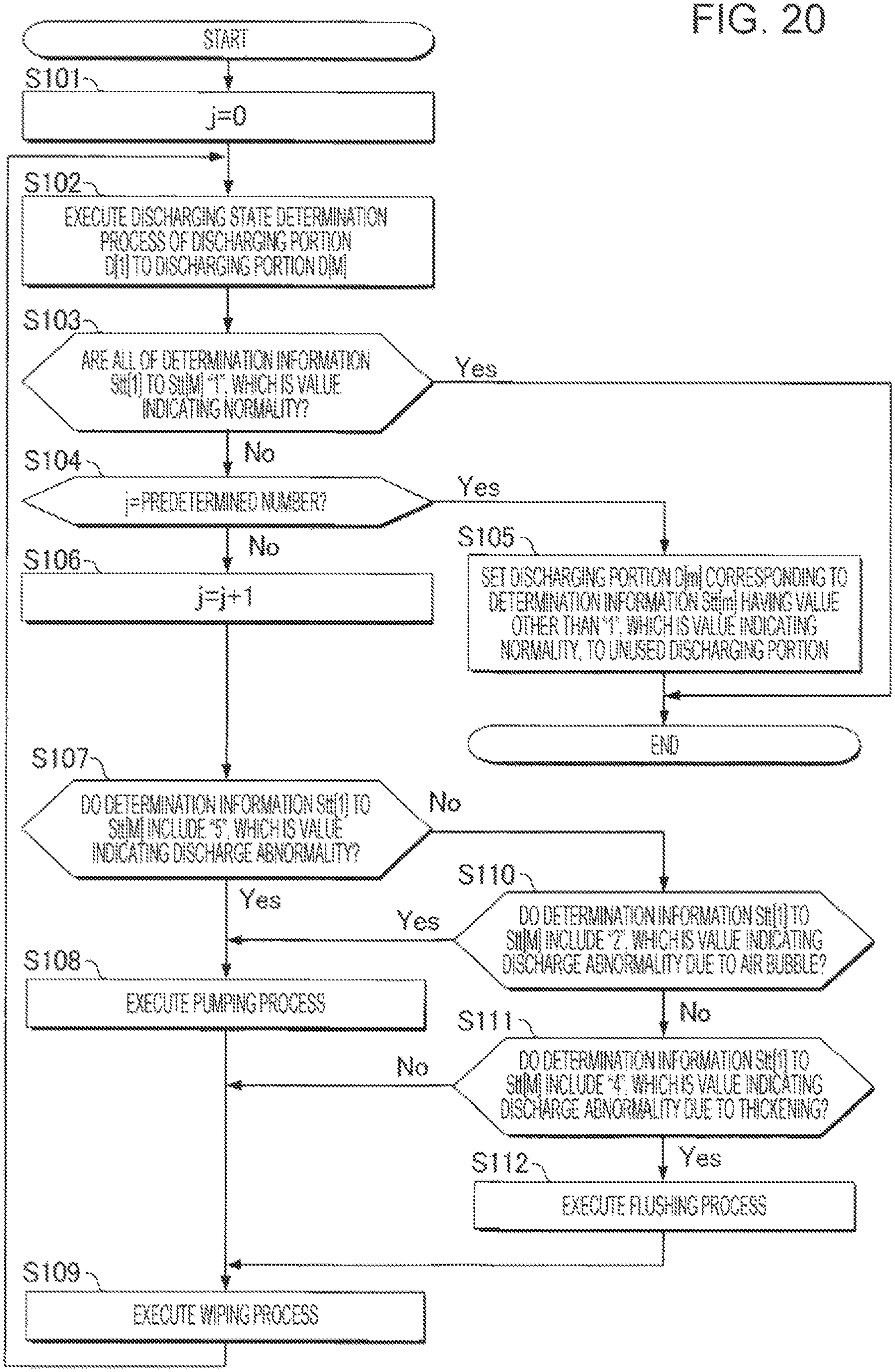
FIG. 20 is a view illustrating a flowchart illustrating the maintenance process according to a discharge abnormality.

FIG. 20 is a flowchart illustrating the maintenance process according to the discharge abnormality of the discharging portion D.

In step S101, the control portion 6 substitutes 0 for the variable j.

In step S102, as described above, the control portion 6 executes the discharging state determination process for generating the determination information Stt[1] to the determination information Stt[M] for each of the discharging portion D[1] to the discharging portion D[M].

Next, in step S103, the control portion 6 determines whether or not all of the determination information Stt[1] to the determination information Stt[M] acquired in step S102 are "1", which is a value indicating normality. When the determination result in step S103 is positive, the ink jet printer 1 ends the series of processes illustrated in FIG. 20.

On the other hand, when the determination result in step S103 is negative, in step S104, the control portion 6 determines whether or not the variable j reached the predetermined number. The predetermined number is a natural number of j or more, and defines the number of repetitions of the maintenance process according to the discharge abnormality of the discharging portion D.

When the variable j reached the predetermined number, in step S105, among the determination information Stt[1] to the determination information Stt[M], the control portion 6 sets the discharging portion D[M] corresponding to the determination information Stt[M] having a value other than "1", which is a value indicating normality, to an unused discharging portion that is not used during printing, and the ink jet printer 1 ends the series of processes illustrated in FIG. 20.

On the other hand, when the variable j does not reach the predetermined number, the control portion 6 increases the value of the variable j by one in step S106.

Next, in step S107, the control portion 6 determines whether or not the determination information Stt[1] to the determination information Stt[M] acquired in step S102 include the determination information Stt indicating "5", which is a value indicating the discharge abnormality.

When the determination result in step S107 is positive, the control portion 6 executes the pumping process in step S108. Subsequently, the control portion 6 executes the wiping process in step S109 and returns the process to step S102.

On the other hand, when the determination result in step S107 is negative, in step S110, the control portion 6 determines whether or not the determination information Stt[1] to the determination information Stt[M] include the determination information Stt indicating "2", which is a value indicating the discharge abnormality due to air bubbles.

When the determination result in step S110 is positive, the control portion 6 executes the pumping process in step S108. Subsequently, the control portion 6 executes the wiping process in step S109 and returns the process to step S102.

On the other hand, when the determination result in step S110 is negative, in step S111, the control portion 6 determines whether or not the determination information Stt[1] to the determination information Stt[M] include the determination information Stt indicating "4", which is a value indicating the discharge abnormality due to thickening.

When the determination result in step S111 is negative, that is, when the determination information Stt indicates "3" which is a value indicating the discharge abnormality due to attachment of foreign matter, the control portion 6 executes the wiping process in step S109 and returns the process to step S102.

On the other hand, when the determination result in step S111 is positive, in step S112, the control portion 6 executes the flushing process and returns the process to step S102.

In the flushing process of step S112, a predetermined amount of ink can be discharged from the discharging portion D. Alternatively, in the flushing process of step S112, the thickening elimination process using the residual vibration described above can also be executed.

As described above, in the present embodiment, the maintenance process according to the determination information Stt is performed.

1.8. Round-Up of First Embodiment

As described above, in the flushing process, the ink jet printer 1 according to the first embodiment determines the number of execution shots $FC_{R[i]}[m]$ at the discharging portion D[m] based on the attenuation factor λ[m] measured in each of the discharging portion D[1] to the discharging portion D[m].

Since the discharging portion D[1] to the discharging portion D[m] are arranged in one plane of the head unit HU, the thickening degree may differ between the discharging portion D positioned at the end portion of an array group and the discharging portion D positioned at the central portion of the array group. Further, in a plurality of discharging portions D, the thickening degree may differ because of the manufacturing variations of the flow path and the like. In particular, in the printing process, since the discharging according to the print data Img is performed on the discharging portion D[1] to the discharging portion D[M], the status of the discharging of the nozzle N in each discharging portion D is different, and the state of the flow of the ink in each discharging portion D is different. Further, since the influence of the wind generated by the relative movement between the head unit HU and the recording paper P in the printing process and the influence of the environmental state around the head unit HU differ depending on the position of the discharging portion D, the thickening degree of the discharging portion D[1] to the discharging portion D[M] after the execution of the printing process varies.

However, by executing the flushing process of the discharging portion D[m] for the number of execution shots $FC_{R[i]}[m]$, which is determined based on the attenuation factor λ[m] measured at the discharging portion D[m], the discharging portion D[m] can discharge an appropriate amount of ink in just proportion to eliminate the thickening of the ink inside the discharging portion D[m]. In particular, even after the execution of the printing process, in which the thickening degree of the discharging portion D[1] to the discharging portion D[m] varies, by executing the flushing process for the number of execution shots $FC_{R[i]}$[1] to the number of execution shots $FC_{R[i]}[M]$, which are determined based on each of the attenuation factor λ [1] to the attenuation factor λ[M] of the discharging portion D[1] to the discharging portion D[M] after the execution of the printing process, the flushing process can be performed with an appropriate discharging amount of ink in just proportion to eliminate the thickening of the ink inside the discharging portion D[1] to the discharging portion D[M].

Further, as described above, the attenuation factor characteristic R1 includes the thickening state ThA, the thickening state ThB, and the thickening state ThC, in which the change in attenuation factor λ with respect to the number of shots FC does not indicate a constant proportional relationship throughout and the change rates are different. Further, the attenuation factor characteristic R1 shows different characteristics depending on the state of the flow of the ink, the discharge characteristic of the nozzle N, the variation in the diameter of the nozzle N, the temperature of the ink, the humidity of the ink, and the type of ink, in the discharging portion D[m]. Therefore, when calculating the number of shots required for the ink inside the discharging portion D[m] to decrease to the viscosity corresponding to the target attenuation factor $\lambda_{target}$ based on the attenuation factor λ acquired at the start of the flushing process and the predetermined attenuation factor characteristic, a large error may occur.

However, by executing the flushing process of the discharging portion D[m] for the number of execution shots $FC_{R[i]}[m]$, which is determined based on the most recent two times of attenuation factor $\lambda_{old[i]}[m]$ and the attenuation factor $\lambda_{new[i]}[m]$ measured at the discharging portion D[m], the discharging portion D[m] can discharge an appropriate amount of ink in just proportion to eliminate the thickening of the ink inside the discharging portion D[m].

More specifically, the number of temporary shots $FC_{temp[i]}$ is calculated based on the attenuation factor $\lambda_{old[i]}$, the attenuation factor $\lambda_{new[i]}$, the target attenuation factor $\lambda_{target}$, and the number of most recent shots $FC_{recent[i]}$, and the flushing process can be performed for an appropriate number of shots FC until the attenuation factor λ of the ink in the discharging portion D reaches the target attenuation factor $\lambda_{target}$ by performing the flushing process for the number of execution shots $FC_{R[i]}$ that is less than the number of maximum shots $FC_{max}$.

As described above, the ink jet printer 1 in the first embodiment is a liquid discharging apparatus including the discharging portion D provided with the nozzle N for discharging the ink. Thereafter, the ink jet printer 1 acquires the attenuation factor $\lambda_1$ indicating the viscosity of the ink inside the discharging portion D, acquires the attenuation factor $\lambda_2$ indicating the viscosity of the ink inside the discharging portion D by discharging the amount of defined flushing of ink from the discharging portion D, and executes the maintenance method in which an amount of ink, which is obtained by multiplying the unit amount of flushing by the number of execution shots $FC_{R[1]}$ based on the attenuation factor $\lambda_1$ and an attenuation factor $\lambda_2$, is discharged from the discharging portion D.

The attenuation factor $\lambda_1$ indicates the viscosity of the ink inside the discharging portion D in the state before the flushing process is executed for the number of defined shots $FC_{ini}$, and the attenuation factor $\lambda_2$ indicates the viscosity of the ink inside the discharging portion D in the state after the flushing process is executed for the number of defined shots $FC_{ini}$. Since the actual attenuation factor characteristic of the ink inside the discharging portion D can be specified to some extent by the attenuation factor $\lambda_1$ and the attenuation factor $\lambda_2$, the amount of ink to be discharged until the thickening of the discharging portion D is eliminated can be specified for each discharging portion D. The ink jet printer 1 can reduce the deterioration of the printing quality due to printing without discharging thickened ink by discharging the amount of ink obtained by multiplying the unit amount of flushing by the number of execution shots $FC_{R[1]}$, so that it is possible to reduce the excessive discharge of the ink that is not thickened in the maintenance, resulting the ink consumption can be reduced.

Further, in the aspect in which the number of execution shots $FC_{R[1]}$ is determined according to the nozzle sealing period, since the viscosity of each of the plurality of discharging portions D cannot be detected, the thickened ink cannot be sufficiently discharged at the discharging portion D where the thickening of the ink progresses relatively, and the ink that is not thickened is discharged at the discharging portion D where the thickening of the ink does not progress relatively. On the other hand, in the first embodiment, since the viscosity of the liquid held in each of the plurality of discharging portions D can be detected, the number of execution shots $FC_{R[1]}$ can be determined according to the viscosity of the liquid held in each of the plurality of discharging portions D.

Further, the control portion 6 determines the number of execution shots $FC_{R[1]}$ based on the attenuation factor $\lambda_1$, the attenuation factor $\lambda_2$, and the target attenuation factor $\lambda_{target}$ related to the viscosity in a state in which the ink inside the discharging portion D is not thickened.

The ink jet printer 1 can execute the maintenance process so that the viscosity of the ink inside the discharging portion D reaches the target attenuation factor $\lambda_{target}$.

The control portion 6 determines the number of execution shots $FC_{R[1]}$ based on a difference value between the attenuation factor $\lambda_1$ and the attenuation factor $\lambda_2$, a difference value between the attenuation factor $\lambda_2$ and the target attenuation factor $\lambda_{target}$ and the number of defined shots $FC_{ini}$.

In the thickening state ThB described above, it can be said that the viscosity of the ink decreases linearly according to the discharging amount of the ink from the discharging portion D. When the viscosity of the ink decreases linearly according to the discharging amount of the ink from the discharging portion D, the proportional formula shown below is established.

Difference value between attenuation factor λ1 and attenuation factor $\lambda_2$: Number of defined shots $FC_{ini}$=Difference value between attenuation factor $\lambda_2$ and target attenuation factor $\lambda_{target}$: Number of execution shots $FC_{R[1]}$.

According to the above proportional formula, when the viscosity of the ink decreases linearly according to the discharging amount of the ink from the discharging portion D, the control portion 6 can obtain an appropriate number of execution shots $FC_{R[1]}$ by using the difference value between the attenuation factor $\lambda_1$ and the attenuation factor $\lambda_2$, the difference value between the attenuation factor $\lambda_2$ and the target attenuation factor $\lambda_{target}$ and the number of defined shots $FC_{ini}$.

The control portion 6 determines the number of temporary shots $FC_{temp[1]}$ by using the following equation (6), determines the number of temporary shots $FC_{temp[1]}$ as the number of execution shots $FC_{R[1]}$ when the number of temporary shots $FC_{temp[1]}$ is less than the number of maximum shots $FC_{max}$, and determines the number of maximum shots $FC_{max}$ as the number of execution shots $FC_{R[1]}$ when the number of temporary shots $FC_{temp[1]}$ is equal to or greater than the number of maximum shots $FC_{max}$.

As the thickening state ThA, in a case where the degree to which the viscosity of the ink decreases according to the discharging amount of the ink from the discharging portion D is low when the flushing process is executed for the number of temporary shots $FC_{temp[1]}$ calculated by using the equation (6), there is a possibility that the ink is excessively discharged and the ink consumption is increased. Therefore, when the number of temporary shots $FC_{temp[1]}$ is equal to or greater than the number of maximum shots $FC_{max}$, by determining the number of maximum shots $FC_{max}$ as the number of execution shots $FC_{R[1]}$, it is possible to reduce the excessive discharging of the ink.

Further, the number of defined shots $FC_{ini}$ is less than the number of maximum shots $FC_{max}$. As described above, in a case where the number of defined shots $FC_{ini}$ is set too large, there is a possibility that the ink is excessively discharged when the thickening state of the ink inside the discharging portion D is the thickening state ThC. Therefore, as compared with the aspect in which the number of defined shots $FC_{ini}$ is equal to or greater than the number of maximum shots $FC_{max}$, it is possible to reduce the excessive discharging of the ink since the number of defined shots $FC_{ini}$ is less than the number of maximum shots $FC_{max}$.

Further, the amount of defined flushing is less than the volume of the flow path of the discharging portion D. The thickening of the ink inside the discharging portion D can be eliminated by discharging all the ink inside the discharging portion D. Therefore, as compared with the aspect in which the amount of defined flushing is equal to or greater than the volume of the flow path of the discharging portion D, it is possible to reduce the excessive discharging of the ink since the amount of defined flushing is less than the volume of the flow path of the discharging portion D.

The control portion 6 acquires the attenuation factor $\lambda_{3[1]}$ indicating the viscosity of the ink inside the discharging portion D after discharging the amount of ink obtained by multiplying the unit amount of flushing by the number of execution shots $FC_{R[1]}$ to the discharging portion D, and determines whether or not to discharge the ink from the discharging portion D based on the attenuation factor $\lambda_{3[1]}$.

When the attenuation factor $\lambda_{3[1]}$ indicates that the ink inside the discharging portion D is thickened, it is possible to reduce the deterioration of the printing quality due to the failure to discharge the thickened ink by continuing the thickening elimination process using the residual vibration. On the other hand, when the attenuation factor $\lambda_{3[1]}$ indicates that the ink inside the discharging portion D is not thickened, it is possible to reduce the excessive discharging of the ink by ending the thickening elimination process using the residual vibration.

Further, the attenuation factor λ is information obtained by displacing the piezoelectric element PZ due to the residual vibration generated in the ink inside the discharging portion after displacing the piezoelectric element PZ by supplying the drive signal.

According to the first embodiment, the displacement amount of the piezoelectric element PZ changes according to the change in residual vibration which changes according to the viscosity of the ink inside the discharging portion D. Therefore, by the fact that the attenuation factor λ is the information obtained by the displacement of the piezoelectric element PZ due to the residual vibration, the viscosity of the ink inside the discharging portion D can be specified, so that the amount of ink discharged from the discharging portion can be appropriately set based on the attenuation factor λ.

The discharging portion D is provided with the piezoelectric element PZ that is displaced by supplying the drive signal Com, the cavity 320 in which the internal pressure is increased or decreased by the displacement of the piezoelectric element PZ, and the nozzle N that communicates with the pressure chamber and discharges the ink, and the attenuation factor $\lambda_1$ and the attenuation factor $\lambda_2$ are information based on the residual vibration generated inside the discharging portion D after the drive signal Com is supplied to the piezoelectric element PZ.

The residual vibration signal NES indicating the residual vibration generated by the measurement circuit 9 is also used to detect the discharge abnormality of the discharging portion D. Therefore, when the ink jet printer 1 is provided with the measurement circuit 9 for detecting the discharge abnormality of the discharging portion D, the existing mechanism can detect the viscosity information of the ink inside the discharging portion D without providing a new mechanism for detecting the viscosity information of the ink inside the discharging portion D used for the flushing process. That is, the measurement circuit 9 provided in the ink jet printer 1 can be used for both the detection of the discharge abnormality of the discharging portion D and the detection of the viscosity information for adjusting the appropriate discharging amount in the flushing process.

Further, the ink jet printer 1 in the first embodiment is a liquid discharging apparatus including the discharging portion D for discharging the ink and executing the printing process of forming an image by discharging the ink. Thereafter, the ink jet printer 1 executes the driving method for executing the thickening elimination process using the residual vibration after the execution of the printing process. More specifically, the period after the execution of the printing process is a period from immediately after the execution of the printing process to the end of the maintenance process and the sealing of the nozzle N by the cap 42.

During the printing process, the discharging amount of the ink from each discharging portion D is controlled according to image information, so that the discharging frequencies of the plurality of discharging portions D are not uniform. Further, the flow of airflow due to the relative movement between the head unit HD and the recording paper P or the influence on the viscosity change of the ink inside the discharging portion D due to the ambient temperature may differ depending on the location where the discharging portion D is disposed. Therefore, it is possible to reduce the influence on the image quality in the next printing process by eliminating the viscosity variation of the ink inside the discharging portion D that is generated during printing after the printing is ended. Therefore, when a preset discharging amount is discharged from all discharging portions D after the printing is ended, the thickened ink cannot be sufficiently discharged at the discharging portion D where the thickening of the ink inside the discharging portion D progresses relatively, and the ink that is not thickened is discharged at the discharging portion D where the thickening of the ink inside the discharging portion D does not progress relatively. On the other hand, in the first embodiment, since the viscosity of the ink inside each discharging portion D can be specified by the attenuation factor λ representing the viscosity of the ink inside each discharging portion D by using the residual vibration, the number of execution shots $FC_{R[1]}$ of the flushing process can be appropriately set according to the status of the viscosity of the ink inside each discharging portion D after the execution of the printing process.

2. SECOND EMBODIMENT

In the first embodiment, in step S60, the flushing process is not executed more than the number of maximum shots $FC_{max}$. On the other hand, the second embodiment is different from the first embodiment in that when it is determined that the change in attenuation factor λ is linear, the flushing process is executed more than the number of maximum shots $FC_{max}$.

Figure 21:
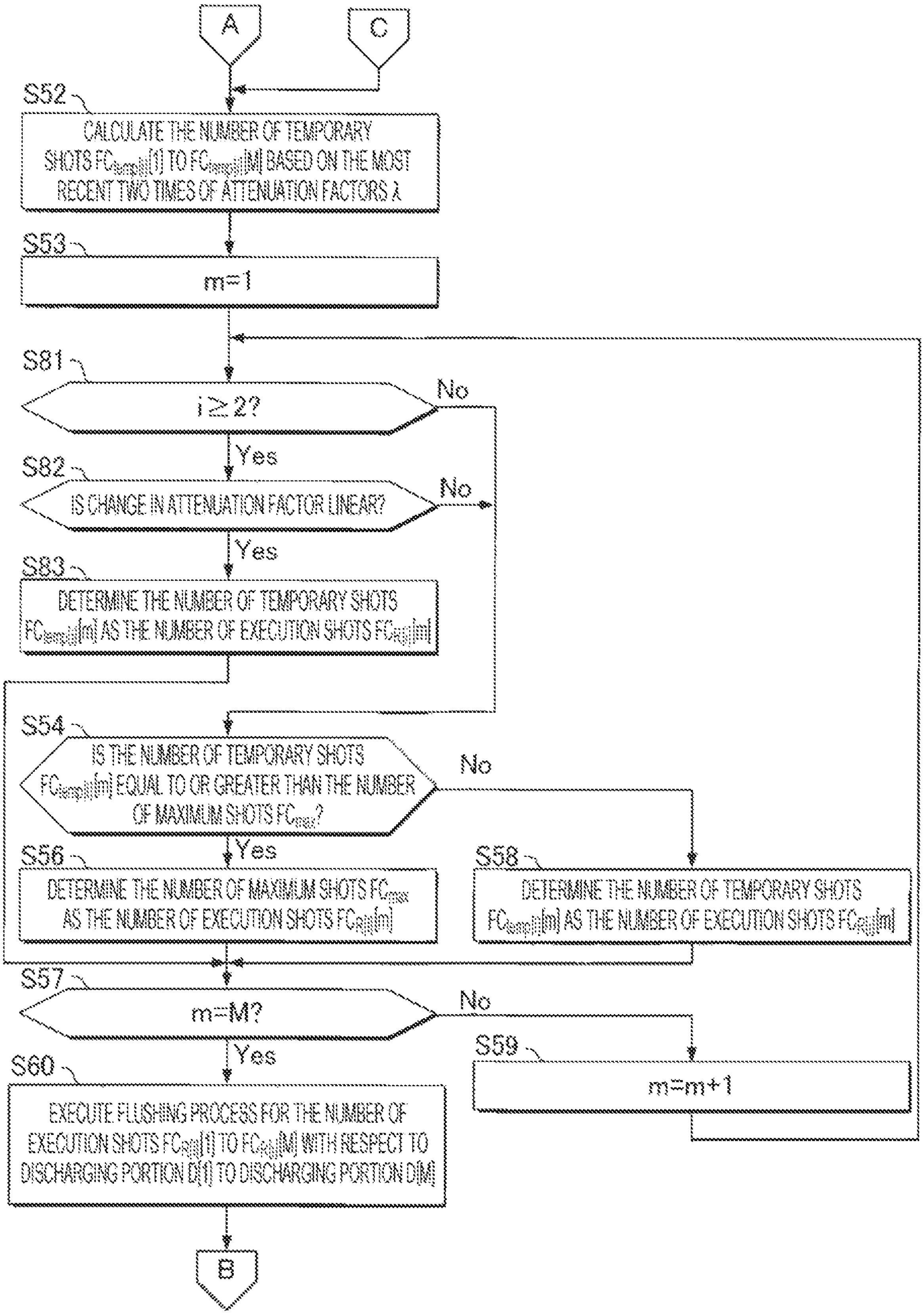
FIG. 21 is a view illustrating a flowchart illustrating a thickening elimination process using residual vibration according to a second embodiment.

2.1. Thickening Elimination Process Using Residual Vibration in Second Embodiment FIG. 21 is a flowchart illustrating the thickening elimination process using the residual vibration in the second embodiment. However, among the thickening elimination processes using the residual vibration in the first embodiment, the series of processes illustrated in FIGS. 17 and 19 are the same as a part of the thickening elimination processes using the residual vibration in the second embodiment. In the thickening elimination process using the residual vibration in the second embodiment, the same parts as the series of processes illustrated in FIGS. 17 and 19 will be omitted from the illustration and description.

After the end of the process of the same parts as the series of processes illustrated in FIG. 17, in step S52 as in the first embodiment, the control portion 6 calculates the number of temporary shots $FC_{temp[i]}[1]$ to the number of temporary shots $FC_{temp[i]}[m]$, and substitutes 1 for the variable m in step S53.

Subsequently, in the second embodiment, the control portion 6 determines in step S81 whether or not the value of the variable i is 2 or more.

When the determination result in step S81 is positive, the control portion 6 advances the process to step S82. In step S82, the control portion 6 determines whether or not the change in attenuation factor λ is linear. For example, the control portion 6 determines whether or not the change in attenuation factor λ is linear by any one of the two aspects illustrated below. In a first aspect, in a case where the value of the variable i is 2 or more, the control portion 6 determines that the change in attenuation factor λ is linear when a difference between a value, which is obtained by dividing a value obtained by subtracting the attenuation factor $\lambda_{new[i]}$ from the attenuation factor $\lambda_{old[i]}$ by the number of execution shots $FC_{R[i-1]}[m]$, and a value, which is obtained by dividing a value obtained by subtracting the attenuation factor $\lambda_{new[i-1]}$ from the attenuation factor $\lambda_{old[i-1]}$ by the number of execution shots $FC_{R[i-2]}[m]$, is within a predetermined value. In a second aspect, in a case where the value of the variable i is 2 or more, the control portion 6 determines that the change in attenuation factor λ is linear when a value, which is obtained by adding the number of temporary shots $FC_{temp[i]}$ to the number of execution shots $FC_{R[i-1]}[m]$ at the immediately preceding flushing process, substantially matches the number of temporary shots $FC_{temp[i-1]}$.

When the determination result in step S82 is negative, the control portion 6 advances the process to step S54 illustrated in FIG. 20, determines whether or not the number of temporary shots $FC_{temp[i]}[m]$ is equal to or greater than the number of maximum shots $FC_{max}$ in step S54 similar to the first embodiment, determines the number of maximum shots $FC_{max}$ as the number of execution shots $FC_{R[i]}[m]$ in step S56 when the number of temporary shots $FC_{temp[i]}[m]$ is equal to or greater than the number of maximum shots $FC_{max}$, determines the number of temporary shots $FC_{temp[i]}[m]$ as the number of execution shots $FC_{R[i]}[m]$ in step S58 when the number of temporary shots $FC_{temp[i]}[m]$ is not equal to or greater than the number of maximum shots $FC_{max}$, and advances the process to step S57.

On the other hand, when the determination result in step S82 is positive, the control portion 6 determines the number of temporary shots $FC_{temp[i]}[m]$ as the number of execution shots $FC_{R[i]}[m]$ in step S83 and advances the process to step S57.

Subsequently, the control portion 6 executes the processes after step S57 in the same manner as in the first embodiment. Since the processes after step S57 illustrated in FIG. 21 are the same as the processes after step S57 illustrated in FIG. 18, the description thereof will be omitted. However, the control portion 6 returns the process to step S81 after the process in step S59 is ended.

2.2. Round-Up of Second Embodiment

As described above, in the second embodiment, in a case where it is determined that the change in attenuation factor λ is linear, even when the number of temporary shots $FC_{temp[i]}$[m] is greater than the number of maximum shots $FC_{max}$, the attenuation factor λ of the ink inside the discharging portion D[m] can be made closer to the target attenuation factor $\lambda_{target}$ by the flushing process in which the number of temporary shots $FC_{temp[i]}$[m] is determined as the number of execution shots $FC_{R[i]}$[m]. Therefore, as compared with the first embodiment, the number of calculations in the equation (6) and the number of acquisitions of the attenuation factor $\lambda_{3[i]}$ can be reduced. On the other hand, in the first embodiment, since the flushing process is not executed for the number of maximum shots $FC_{max}$ or more, it is possible to more reliably reduce the excessive discharging of the ink as compared with the second embodiment.

3. THIRD EMBODIMENT

In the first embodiment, the attenuation factor λ is acquired a plurality of times to determine the number of execution shots $FC_{R[1]}$ of the flushing process. On the other hand, the third embodiment is different from the first embodiment in that the number of execution shots $FC_{Ra}$ of the flushing process is determined based on the temperature information inside the head unit HUa, the one time attenuation factor λ, and the attenuation factor characteristic information INFO-A in the third embodiment.

3.1. Outline of Ink Jet Printer 1 in Third Embodiment

Figure 22:
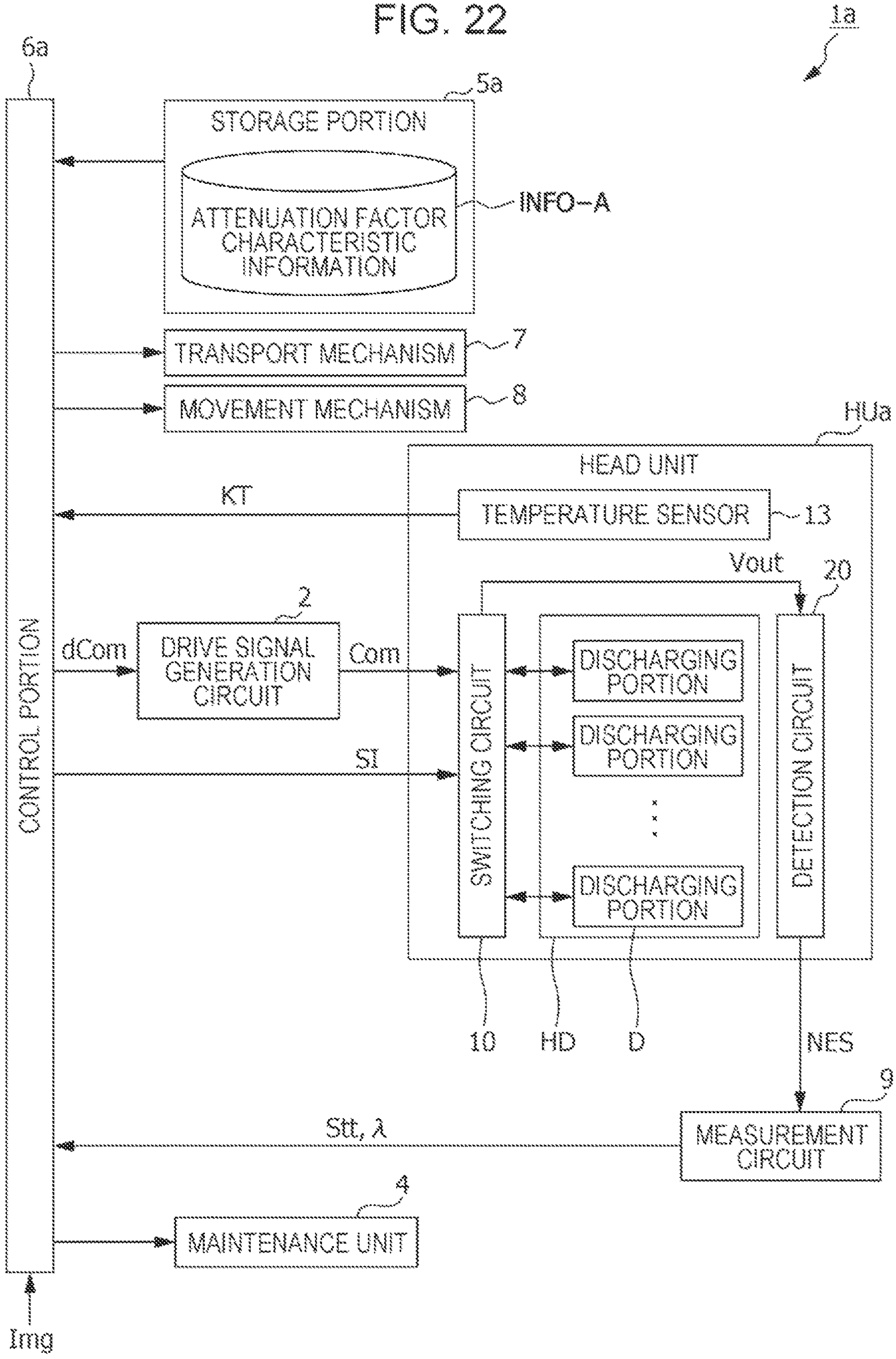
FIG. 22 is a schematic view illustrating an ink jet printer 1*a*.

FIG. 22 is a schematic view illustrating an ink jet printer 1*a*. The ink jet printer 1*a* differs from the ink jet printer 1 in that a head unit HUa is included instead of the head unit HU, a storage portion 5*a* is included instead of the storage portion 5, and a control portion 6*a* is included instead of the control portion 6.

The head unit HUa has a temperature sensor 13 that measures the temperature of the head unit HUa. The temperature sensor 13 measures the temperature of the head unit HUa, generates temperature information KT indicating the measurement result, and outputs the temperature information KT.

In the third embodiment, it is assumed that the temperature sensor 13 is mounted on an electronic circuit on a substrate provided in the head unit HUa to detect the temperature of the head unit HU, but the present disclosure is not limited to such an aspect. The temperature sensor 13 may be able to detect the temperature of the head unit HUa. However, a place targeted by the temperature sensor 13 for temperature detection is preferably a place capable of estimating the temperature of the ink that fills the discharging portion D. Therefore, it is preferable that the temperature sensor 13 is provided so as to be able to detect the temperature inside the housing of the head unit HUa.

The storage portion 5*a* stores the attenuation factor characteristic information INFO-A in addition to a control program of the ink jet printer 1*a*. Attenuation factor characteristic information INFO-A shows a relationship between the measured attenuation factor λ and the number of thickening elimination shots $FC_E$ for each of a plurality of temperatures that the head unit HUa can take. The number of thickening elimination shots $FC_E$ is the number of shots FC corresponding to the discharging amount of the flushing process for the discharging portion D, which is filled with the ink in a state of the attenuation factor λ, required until the thickening is eliminated and the viscosity of the ink shows the target attenuation factor $\lambda_{target}$. In the following description, in order to indicate that the number of thickening elimination shots $FC_E$ is a specific value, the number of thickening elimination shots $FC_{Ex}$ may be expressed by using one or more alphanumeric characters x. The plurality of temperatures are, for example, 15 degrees, 20 degrees, and 25 degrees. An example of the contents of the attenuation factor characteristic information INFO-A at a certain temperature will be described with reference to FIG. 21.

FIG. 23 is an explanatory view illustrating an example of the contents of the attenuation factor characteristic information INFO-A. In FIG. 23, the attenuation factor characteristic information INFO-A shows the relationship between the attenuation factor λ and the number of thickening elimination shots $FC_E$ when the temperature of the head unit HUa is xx degrees. The attenuation factor $\lambda_a$, the attenuation factor $\lambda_b$, . . . , and the attenuation factor $\lambda_z$ illustrated in FIG. 23 correspond to the number of thickening elimination shots $FC_{Ea}$, the number of thickening elimination shots $FC_{Eb}$, . . . , and the number of thickening elimination shots $FC_{Ez}$, respectively. For example, when the attenuation factor λ of the ink that fills the discharging portion D is the attenuation factor $\lambda_a$, it is shown that the thickening of the ink inside the discharging portion D can be eliminated by executing the flushing process for the number of thickening elimination shots $FC_{Ea}$.

The designer of the ink jet printer 1 sets, for each attenuation factor λ, the number of thickening elimination shots $FC_{Ea}$ at which the thickening of the ink inside the discharging portion D according to the attenuation factor λ of the ink that fills the discharging portion D that is obtained by experiment or experience for each of the plurality of the temperatures that the head unit HU can take, is eliminated.

The ink jet printer 1*a* executes the thickening elimination process using the residual vibration in the third embodiment. The thickening elimination process using the residual vibration in the third embodiment will be described with reference to FIG. 24.

Figure 24:
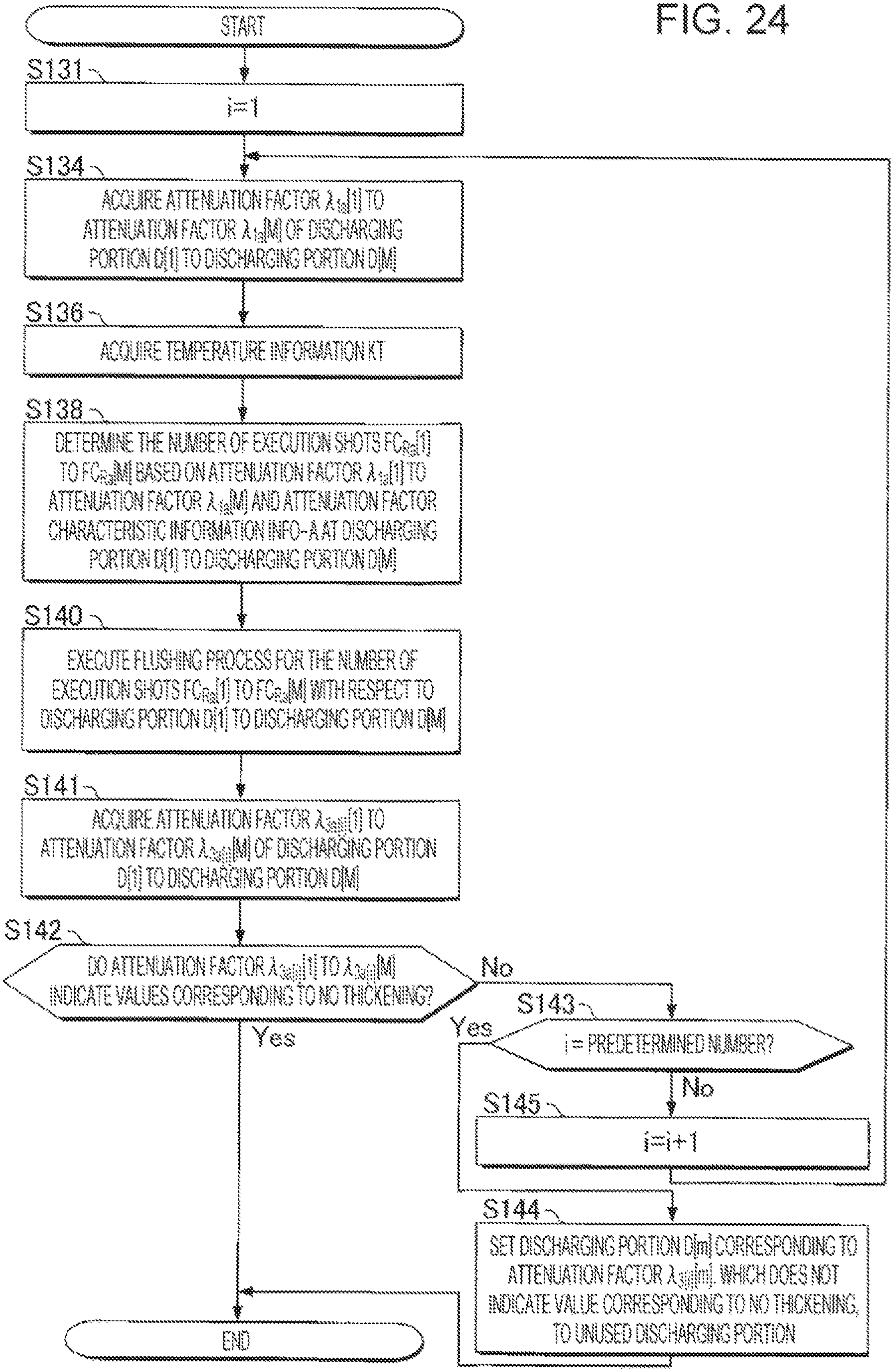
FIG. 24 is a view illustrating a flowchart illustrating a thickening elimination process using residual vibration according to a third embodiment.

3.2. Thickening Elimination Process Using Residual Vibration in Third Embodiment FIG. 24 is a flowchart illustrating the thickening elimination process using the residual vibration in the third embodiment. The control portion 6*a* substitutes 1 for the variable i in step S131. Subsequently, in step S134, the control portion 6*a* sets the discharging portion D[1] to the discharging portion D[m] as the determination target discharging portion D-H in order, acquires the attenuation factor $\lambda_{1a}$ and stores the attenuation factor λ1*a*[1] to the attenuation factor $\lambda_{1a}$[M] corresponding to the discharging portion D[1] to the discharging portion D[M] to the storage portion 5*a*. Further, the control portion 6*a* acquires the temperature information KT from the temperature sensor 13 in step S136.

In step S138, the control portion 6*a* determines the number of execution shots $FC_{Ra}$[1] to the number of execution shots $FC_{Ra}$[M] of the flushing process based on the attenuation factor λ1*a*[1] to the attenuation factor $\lambda_{1a}$[m], the temperature information KT, and the attenuation factor characteristic information INFO-A. As a method for determining the specific number of execution shots $FC_{Ra}$[1] to the number of execution shots $FC_{Ra}$[M], the control portion 6*a* determines the number of execution shots $FC_{Ra}$[m] by using any one of various interpolations such as the nearest neighbor interpolation, a linear interpolation, and a spline interpolation. When the nearest neighbor interpolation is used, the control portion 6*a* specifies the temperature closest to the temperature indicated by the temperature information KT among a plurality of temperatures that have a one-to-one correspondence to a plurality of attenuation factor characteristics in the attenuation factor characteristic information INFO-A. Next, the control portion 6*a* refers to the attenuation factor characteristic corresponding to the specified temperature and determines the number of thickening elimination shots $FC_E$ corresponding to the attenuation factor λ closest to the attenuation factor λ1*a*[m] as the number of execution shots $FC_{Ra}$[m].

After the process in step S138 is ended, in step S140, the ink jet printer 1*a* executes the flushing process for the respectively corresponding number of execution shots $FC_{Ra}$ [1] to the number of execution shots $FC_{Ra}$[M] with respect to the discharging portion D[1] to the discharging portion D[M]. The amount obtained by multiplying the unit amount of flushing by the number of execution shots $FC_{Ra}$[m] corresponds to the "amount based on the viscosity information" of the discharging portion D[m].

After the process in step S140 is ended, in step S141, the control portion 6*a* sets the discharging portion D[1] to the discharging portion D[m] as the determination target discharging portion D-H in order, acquires the attenuation factor $\lambda_{3a[i]}$[1] to the attenuation factor $\lambda_{3a[i]}$[M] corresponding to the discharging portion D[1] to the discharging portion D[m], and stores the acquired results to the storage portion 5*a*.

After the process in step S141 is ended, in step S142, the control portion 6*a* determines whether or not the attenuation factor $\lambda_{3a[i]}$[1] to the attenuation factor $\lambda_{3a[i]}$[M] indicate values corresponding to no thickening. Specifically, the control portion 6*a* determines whether or not the attenuation factor $\lambda_{3a[i]}$[1] to the attenuation factor $\lambda_{3a[i]}$[M] are equal to or less than the target attenuation factor $\lambda_{target}$.

When the determination result in step S142 is positive, for example, when the attenuation factor $\lambda_{3a[i]}$[1] to the attenuation factor $\lambda_{3a[i]}$[m] are equal to or less than the target attenuation factor $\lambda_{target}$ the ink jet printer 1*a* ends the series of processes illustrated in FIG. 24.

On the other hand, when the determination result in step S142 is negative, for example, when any of the attenuation factor $\lambda_{3a[i]}$[1] to the attenuation factor $\lambda_{3a[i]}$[M] is greater than the target attenuation factor $\lambda_{target}$ in step S143, the control portion 6*a* determines whether or not the variable i reached a predetermined number. The predetermined number is a natural number of 2 or more and defines the number of repetitions of the process.

When the variable i does not reach the predetermined number, the control portion 6*a* increases the value of the variable i by one in step S145 and returns the process to step S134.

On the other hand, when the determination result in step S143 is positive, in step S144, among the attenuation factor $\lambda_{3a[i]}$[1] to the attenuation factor $\lambda_{3a[i]}$[M], the control portion 6*a* sets the discharging portion D[m] corresponding to the attenuation factor $\lambda_{3a[i]}$[m], which does not indicate a value indicating no thickening, to the unused discharging portion that is not used during printing, and the ink jet printer 1 ends the series of processes illustrated in FIG. 24.

According to the third embodiment, the viscosity of the ink inside the discharging portion D can be specified by the attenuation factor $\lambda_{1a}$ representing the viscosity of the ink inside the discharging portion D. Based on the measured attenuation factor $\lambda_{1a}$ of the ink inside the discharging portion D and the attenuation factor characteristic information INFO-A stored in the storage portion 5*a*, the number of execution shots $FC_{Ra}$ of the flushing process for adjusting the viscosity of the ink inside the discharging portion D to the optimum viscosity for printing can be appropriately set. On the other hand, as described in the first embodiment, the actual attenuation factor characteristic of the discharging portion D has various factors other than the temperature of the ink, and the attenuation factor characteristic indicated by the attenuation factor characteristic information INFO-A may differ from the actual attenuation factor characteristic of the discharging portion D. Therefore, the ink jet printer 1 in the first embodiment and the second embodiment can determine a more appropriate number of execution shots $FC_R$ as compared with the ink jet printer 1 in the third embodiment.

4. MODIFICATION EXAMPLE

Each of the above forms can be modified in various ways. A specific aspect of modification is exemplified below. Two or more aspects selected from the following exemplifications can be appropriately merged within a range not inconsistent with each other. In the modification examples illustrated below, the elements having the same operations and functions as those of the embodiment will be denoted by the reference numerals referred to in the above description, and detailed description thereof will be appropriately omitted.

4.1. First Modification Example

In the first embodiment and the second embodiment, the control portion 6 determines the number of maximum shots $FC_{max}$ as the number of execution shots $FC_{R[i]}$ when the number of temporary shots $FC_{temp[i]}$ calculated by using the equation (6) is equal to or greater than the number of maximum shots $FC_{max}$ but the present disclosure is not limited to this. For example, the control portion 6 may determine the number of temporary shots $FC_{temp[i]}$ as the number of execution shots $FC_{R[i]}$ regardless of the value of the number of temporary shots $FC_{temp[i]}$.

According to the first modification example, the control portion 6 can reduce the number of calculations in the equation (6), the number of times the abnormal discharging portion D-F generates the residual vibration, and the number of times the attenuation factor $\lambda_{3[i]}$ is acquired as compared with the first embodiment and the second embodiment. On the other hand, in the first embodiment and the second embodiment, the flushing process can be executed for a more appropriate number of execution shots $FC_{Ra}$ as compared with the first modification example.

4.2. Second Modification Example

In the first embodiment, the second embodiment, and the first modification example, regarding the number of maximum shots $FC_{max}$, it is described that the designer of the ink jet printer 1 sets in advance the number of maximum shots $FC_{max}$ according to the maximum allowable period allowed for the thickening elimination process, but the present disclosure is not limited to this. For example, the control portion 6 may set the number of maximum shots $FC_{max}$ according to the nozzle sealing period. For example, the control portion 6 sets the number of maximum shots $FC_{max}$ to a first maximum number of times when the nozzle sealing period is a first period, and sets the number of maximum shots $FC_{max}$ to a second maximum number of times when the nozzle sealing period is a second period. The second period is longer than the first period, and the second maximum number of times is greater than the first maximum number of times.

When the nozzle sealing period is long, the thickening of the ink inside the discharging portion D progresses. Therefore, when the thickening of the ink inside the discharging portion D progresses, there is a possibility that the period required for the thickening elimination process becomes long. According to the second modification example, when the nozzle sealing period is long and the thickening of the ink progresses, it is possible to prevent the period required for the thickening elimination process from becoming long by setting the number of maximum shots $FC_{max}$ to a large number.

4.3. Third Modification Example

In the first embodiment, the second embodiment, the third embodiment, the first modification example, and the second modification example, regarding the target attenuation factor $\lambda_{target}$, it is described that the designer of the ink jet printer 1 sets in advance the attenuation factor λ in a state where the printing quality does not deteriorate, which is obtained by experiment or experience, disclosure is not limited to this. For example, as in the third embodiment, the head unit HU may include the temperature sensor 13, and the control portion 6 may set the target attenuation factor $\lambda_{target}$ based on the measurement result by the temperature sensor 13. More specifically, the control portion 6 sets the target attenuation factor $\lambda_{target}$ to a first value when the temperature information KT indicating the measurement result indicates a first temperature, and sets the target attenuation factor $\lambda_{target}$ to a second value when the temperature information KT indicating the measurement result indicates a second temperature. The second temperature is higher than the first temperature and the second value is smaller than the first value.

Comparing the case where the temperature of the ink inside the discharging portion D is low and the case where the temperature is high, even when the discharging portion D is filled with the ink that is supplied in a state where the ink is not thickened, the attenuation factor λ of the ink at a low temperature is greater than the attenuation factor λ of the ink at a high temperature. In other words, the target attenuation factor $\lambda_{target}$ appropriate for the ink having high temperature is smaller than the target attenuation factor $\lambda_{target}$ appropriate for the ink having low temperature. Therefore, when the temperature of the discharging portion D is high, even when the temperature of the discharging portion D is high, all the ink inside the discharging portion D can be aligned with the target attenuation factor $\lambda_{target}$ by setting the target attenuation factor $\lambda_{target}$ smaller, and the deterioration of printing quality can be reduced.

4.4. Fourth Modification Example

In the first embodiment, the second embodiment, the third embodiment, the first modification example, the second modification example, and the third modification example, although it is described that the attenuation factor λ is information obtained by displacing the piezoelectric element PZ so that the ink is not discharged from the discharging portion D, the attenuation factor λ may be information obtained by displacing the piezoelectric element PZ so that the ink is discharged from the discharging portion D. For example, the attenuation factor λ may be information based on the residual vibration generated in the discharging portion D after the discharging portion D discharges an amount of ink corresponding to the medium dot.

According to the fourth modification example, since the residual vibration becomes larger by displacing the piezoelectric element PZ such that the ink is discharged as compared with the aspect in which the piezoelectric element PZ is displaced so as not to discharge the ink, the measurement accuracy of the voltage value $V_{top1}$, the voltage value $V_{bottom1}$, the voltage value $V_{top2}$, and the voltage value $V_{bottom2}$ is improved, and the error mixed in the attenuation factor λ can be reduced. On the other hand, as in the first embodiment or the like, in the aspect in which the piezoelectric element PZ is displaced such that the ink is not discharged, the ink is not consumed even when the viscosity of the ink inside the discharging portion D is measured, but in the fourth modification example, the ink is consumed when the viscosity of the ink inside the discharging portion D is measured. Therefore, the aspect in which the piezoelectric element PZ is displaced such that the ink is not discharged, can reduce the consumption of the ink as compared with the fourth modification example.

4.5. Fifth Modification Example

In the first embodiment, the second embodiment, the third embodiment, the first modification example, the second modification example, the third modification example, and the fourth modification example, although it is described that the attenuation factor λ is an example of the viscosity information, the viscosity information is not limited to the attenuation factor λ. For example, the ink jet printer 1 may acquire the viscosity information related to the viscosity of the ink inside the discharging portion D by any one of the following two aspects other than the attenuation factor λ based on the residual vibration.

In a first aspect, the ink jet printer 1 measures a flying speed of the droplet discharged from the nozzle N and acquires the measured flying speed as the viscosity information related to the viscosity of the ink inside the discharging portion D. As the thickening of the ink inside the discharging portion D progresses, the flying speed of the droplet discharged from the nozzle N decreases. Therefore, it can be said that the flying speed represents the viscosity of the ink inside the discharging portion D. In order to measure the flying speed of the droplets, the ink jet printer 1 has, for example, a measuring mechanism used for measuring the flying speed at a position in the −Z direction from the head unit HU. This measuring mechanism has, for example, a light emitting portion that emits some light rays such as infrared rays and ultraviolet rays, and a light receiving portion that receives the above-mentioned light rays when there is no obstacle. First, the measuring mechanism acquires the time when the light rays emitted from the light emitting portion are blocked by the droplets and the light receiving portion does not receive the light rays. Next, the ink jet printer 1 specifies, as a flying period, a period from the time when the piezoelectric element PZ is displaced such that the ink is discharged from the discharging portion D to the time when the light receiving portion does not receive the light rays. A flying distance from a position of the nozzle N to a position where the droplets block the light rays emitted from the light emitting portion is a predetermined distance. Thereafter, the ink jet printer 1 calculates a value obtained by dividing the flying distance by the flying period as the flying speed.

In a second aspect, while moving the head unit HU and the recording paper P relative to each other at a predetermined speed, the ink jet printer 1 causes the droplets discharged from the discharging portion D to land on the recording paper P, measures the amount of deviation of the position where the droplet lands on the recording paper P, and acquires the measured amount of deviation as the viscosity information related to the viscosity of the ink inside the discharging portion D. As the thickening of the ink inside the discharging portion D progresses, the flying speed of the droplet discharged from the nozzle N decreases. Since the head unit HU and the recording paper P are relatively moving at the predetermined speed, when the flying speed of the droplet discharged from the nozzle N decreases, the time until the droplet land on the recording paper P becomes long, and the relative movement distance between the head unit HU and the recording paper P during that time becomes long, thereby the position where the droplet lands on the recording paper P deviates from the position where the droplet should originally land. Therefore, it can be said that the amount of deviation represents the viscosity of the ink inside the discharging portion D. In order to measure the amount of deviation, the ink jet printer 1 has an image capturing portion that captures an image of the recording paper P. First, the ink jet printer 1 eliminates the thickening of ink of the discharging portion D in any of the M discharging portions D arranged along a direction intersecting the relative movement directions between the head unit HU and the recording paper P to set to the reference discharging portion D-S. Next, while moving the head unit HU and the recording paper P relative to each other, the ink jet printer 1 simultaneously discharges droplets from the reference discharging portion D-S and the measurement target discharging portion D-M, for which the viscosity of the ink is to be measured, among the M discharging portions D, and causes the droplets to land on the recording paper P. The image capturing portion captures the recording paper P including the droplets discharged from the reference discharging portion D-S and landed on the recording paper P, and the droplets discharged from the measurement target discharging portion D-M and landed on the recording paper P. The ink jet printer 1 acquires image capturing information indicating an image capturing result imaged by the image capturing portion. Based on the image capturing information, the ink jet printer 1 specifies a first position of the droplet discharged from the reference discharging portion D-S and landed on the recording paper P and a second position of the droplet discharged from the measurement target discharging portion D-M and landed on the recording paper P, and specifies a distance between the first position and the second position in the relative movement direction between the head unit HU and the recording paper P as an amount of deviation.

4.6. Sixth Modification Example

In the i-th times of the fourth process of the thickening elimination process of the first embodiment, although the control portion 6 calculates the number of temporary shots $FC_{temp[i]}$ of the flushing process, the control portion 6 may calculate the amount of ink discharged by the i-th times of the fourth process. Hereinafter, the amount of ink discharged by the i-th times of the fourth process is referred to as the "execution discharging amount $FL_{R[i]}$". The execution discharging amount $FL_{R[1]}$ corresponds to a "third amount". For example, when the amount of ink discharged immediately before the i-th times of the fourth process is defined as the discharging amount $FL_{recent[i]}$, the control portion 6 calculates the temporary discharging amount $FL_{temp[i]}$ to be discharged in the i-th times of the fourth process by using the following equation (7).

$$FL_{temp\ [i]} = \frac{\lambda_{new\ [i]} - \lambda_{target}}{\lambda_{old\ [i]} - \lambda_{new\ [i]}} \times FL_{recent\ [i]} \tag{7}$$

When the temporary discharging amount $FL_{temp[i]}$ is less than the maximum discharging amount $FL_{max}$, the control portion 6 determines the temporary discharging amount $FL_{temp[i]}$ as the execution discharging amount $FL_{R[i]}$ and when the temporary discharging amount $FL_{temp[i]}$ is equal to or greater than the maximum discharging amount $FL_{max}$, the control portion 6 determines the maximum discharging amount $FL_{max}$ as the execution discharging amount $FL_{R[i]}$.

4.7. Seventh Modification Example

In the third embodiment, the control portion 6*a* determines the number of execution shots $FC_{R[1]}$ of the flushing process based on the temperature information inside the head unit HU and the one time attenuation factor λ, but the present disclosure is not limited to this. For example, the head unit HU may have a humidity sensor, and the control portion 6*a* may determine the number of execution shots $FC_{R[1]}$ of the flushing process based on the humidity information inside the head unit HU and the one time attenuation factor λ. Further, the control portion 6*a* may determine the number of execution shots $FC_{R[1]}$ of the flushing process based on the temperature information inside the head unit HU, the humidity information inside the head unit HU, and the one time attenuation factor λ.

4.8. Eighth Modification Example

In the first embodiment and the second embodiment, the control portion 6 determines the number of execution shots $FC_{R[i]}$ by using the target attenuation factor $\lambda_{target}$ but may determine the number of execution shots $FC_{R[i]}$ without using the target attenuation factor $\lambda_{target}$. For example, when the value obtained by subtracting the attenuation factor $\lambda_{new[i]}$ from the attenuation factor $\lambda_{old[i]}$ is greater than the value that can be regarded as 0 and less than the first threshold value, the control portion 6 considers that the thickening state of the ink inside the discharging portion D is the thickening state ThA, and determines the first number of times as the number of execution shots $FC_{R[i]}$. Further, when the value obtained by subtracting the attenuation factor $\lambda_{new[i]}$ from the attenuation factor $\lambda_{old[i]}$ is equal to or greater than the first threshold value, the control portion 6 considers that the thickening state of the ink inside the discharging portion D is the thickening state ThB, and determines the second number of times as the number of execution shots $FC_{R[i]}$. In the eighth modification example, the first number of times is greater than the second number of times.

4.9. Ninth Modification Example

In the above embodiment, the attenuation factor λ is generated by the measurement circuit 9 and used as the viscosity information of the liquid, but the present disclosure is not limited to this. The measurement circuit 9 can generate a value corresponding to the viscosity inside the discharging portion D obtained based on the residual vibration signal NES as the viscosity information.

4.10. Tenth Modification Example

In each of the above-described aspects, the serial-type ink jet printer 1 in which a transporting body 82 accommodating the head unit HU is reciprocated in the X axis direction is exemplified, but the present disclosure is not limited to such an aspect. The ink jet printer may be a line-type ink jet printer in which a plurality of nozzles N are distributed over the entire width of the recording paper P.

4.11. Eleventh Modification Example

The ink jet printer exemplified in each of the above-described aspects can be adopted not only in an apparatus dedicated to printing but also in various apparatus such as a facsimile apparatus and a copying machine. Moreover, the application of the liquid discharging apparatus of the present disclosure is not limited to printing. For example, a liquid discharging apparatus that discharges a solution of a coloring material is utilized as a manufacturing apparatus that forms a color filter of a liquid crystal display apparatus. Further, a liquid discharging apparatus that discharges a solution of a conductive material is utilized as a manufacturing apparatus that forms wiring and electrodes of a wiring substrate.

5: APPENDIX

From the above-exemplified embodiment, for example, the following configuration can be ascertained.

A maintenance method for a liquid discharging apparatus according to a first aspect, which is a preferred aspect, is a maintenance method for a liquid discharging apparatus including a discharging portion that discharges liquid, the maintenance method includes: acquiring first viscosity information related to viscosity of the liquid inside the discharging portion; discharging a first amount of the liquid from the discharging portion; acquiring second viscosity information related to viscosity of the liquid in the discharging portion; and discharging a second amount of the liquid based on the first viscosity information and the second viscosity information, from the discharging portion.

According to the first aspect, the liquid discharging apparatus can reduce the deterioration of the printing quality due to the failure to discharge the thickened liquid, and since it is possible to reduce the discharge of the liquid that is not thickened, the consumption of the liquid can be reduced.

In a second aspect, which is a specific example of the first aspect, the second amount is determined based on the first viscosity information, the second viscosity information, and target viscosity information related to viscosity in a state in which the liquid inside the discharging portion is not thickened.

According to the second aspect, the liquid discharging apparatus can accurately specify the amount of liquid to be discharged before the thickening of the liquid inside the discharging portion is eliminated as compared with the aspect in which the second amount is determined without using the target viscosity information.

In a third aspect, which is a specific example of the second aspect, the second amount is determined based on a difference value between the first viscosity information and the second viscosity information, a difference value between the second viscosity information and the target viscosity information, and the first amount.

According to the third aspect, when the viscosity of the liquid decreases linearly according to the discharging amount of the liquid from the discharging portion, the liquid discharging apparatus determines an appropriate second amount by using the difference value between the first viscosity information and the second viscosity information, the difference value between the second viscosity information and the target viscosity information, and the first amount.

In a fourth aspect, which is a specific example of the third aspect, a value obtained by multiplying a value, which is obtained by dividing a first value by a second value, by the first amount is calculated as the second amount, in which the first value is a value obtained by subtracting the target viscosity information from the second viscosity information, and the second value is a value obtained by subtracting the second viscosity information from the first viscosity information.

According to the fourth aspect, the number of times the second amount is determined and the number of times the viscosity information is acquired can be reduced as compared with the fifth aspect.

In a fifth aspect, which is a specific example of the third aspect, a value obtained by multiplying a value, which is obtained by dividing a first value by a second value, by the first amount is calculated as a third amount; the third amount is determined as the second amount when the third amount is less than a specific maximum discharging amount; and the specific maximum discharging amount is determined as the second amount when the third amount is equal to or greater than the specific maximum discharging amount, in which the first value is a value obtained by subtracting the target viscosity information from the second viscosity information, and the second value is a value obtained by subtracting the second viscosity information from the first viscosity information.

In a case where the degree to which the viscosity of the liquid decreases according to the discharging amount of the liquid from the discharging portion is low when the second amount calculated by the fourth aspect is discharged, there is a possibility that the liquid is excessively discharged and the consumption of the liquid is increased. Therefore, according to the fifth aspect, when the third amount is equal to or greater than the specific maximum discharging amount, by determining the specific maximum discharging amount, as the second amount, it is possible to reduce the excessive discharging of the liquid.

In a sixth aspect, which is a specific example of the fifth aspect, the first amount is less than the specific maximum discharging amount.

In a case where the specific maximum discharging amount is increased, when the thickening state of the liquid inside the discharging portion is thickened only inside the nozzle N, there is a possibility that the liquid is excessively discharged. Therefore, according to the sixth aspect, when the first amount is less than the specific maximum discharging amount, it is possible to reduce the excessive discharge of the liquid as compared with the aspect in which the first amount is equal to or greater than the specific maximum discharging amount.

In a seventh aspect, which is a specific example of the fifth or sixth aspect, the discharging portion is provided with a nozzle that discharges the liquid, the liquid discharging apparatus includes a cap configured to seal the nozzle, and the specific maximum discharging amount is set according to a length of a period during which a state in which the nozzle is sealed is maintained.

When a period in which a state where the nozzle is sealed is maintained, is long, the thickening of the liquid inside the discharging portion progresses. Therefore, when the thickening of the liquid inside the discharging portion progresses, there is a possibility that the period required for the thickening elimination process, which eliminates the thickening, becomes long. According to the seventh aspect, when the period in which the state where the nozzle is sealed is maintained, is long and the thickening of the liquid progresses, it is possible to prevent the period required for the thickening elimination process from becoming long by setting the specific maximum discharging amount to a large number.

In an eighth aspect, which is a specific example of any one of the second to seventh aspects, a head unit, which is provided with the discharging portion, includes a temperature sensor, and a measurement result is acquired by the temperature sensor; and the target viscosity information is set based on the acquired measurement result.

Comparing the case where the temperature of the discharging portion is low and the case where the temperature is high, even when the viscosities are the same, there is a high possibility that the deterioration of printing quality occurs at high temperatures. Therefore, according to the eighth aspect, when the temperature of the discharging portion is high, the deterioration of the printing quality can be reduced even when the temperature of the discharging portion is high by setting the target viscosity information smaller.

In a ninth aspect, which is a specific example of any one of the first to eighth aspects, the first amount is less than a volume of a flow path of the discharging portion.

The thickening of the liquid inside the discharging portion can be eliminated by discharging all the liquid inside the discharging portion. Therefore, according to the ninth aspect, when the first amount is less than the volume of the flow path of the discharging portion, it is possible to reduce the excessive discharge of the liquid as compared with the aspect in which the first amount is equal to or greater than the volume of the flow path of the discharging portion.

In a tenth aspect, which is a specific example of any one of the first to ninth aspects, third viscosity information related to viscosity of the liquid inside the discharging portion is acquired after the second amount of the liquid is discharged from the discharging portion; and whether or not to discharge the liquid from the discharging portion is determined based on the third viscosity information.

According to the tenth aspect, when the third viscosity information indicates that the liquid inside the discharging portion is thickened, it is possible to reduce the deterioration of the printing quality due to the failure to discharge the thickened liquid by continuing the thickening elimination process. On the other hand, when the third viscosity information indicates that the liquid inside the discharging portion is not thickened, it is possible to end the thickening elimination process and reduce the excessive discharge of the liquid.

In an eleventh aspect, which is a specific example of any one of the first to tenth aspects, the discharging portion is provided with a piezoelectric element that is displaced when a drive signal is supplied, a pressure chamber in which an internal pressure is increased or decreased when the piezoelectric element is displaced, and the nozzle that communicates with the pressure chamber and discharges the liquid, and the first viscosity information and the second viscosity information is information based on residual vibration generated in the discharging portion after the drive signal is supplied to the piezoelectric element.

The information based on the residual vibration is used not only for the first viscosity information and the second viscosity information used for the maintenance process, but also for detecting the discharge abnormality. Therefore, the liquid discharging apparatus can also be used as a mechanism for detecting a discharge abnormality without providing a new mechanism for obtaining the viscosity information of the liquid inside the discharging portion used for the maintenance process.

What is claimed is:

1. A maintenance method for a liquid discharging apparatus including a discharging portion that discharges liquid, the maintenance method comprising:

acquiring first viscosity information related to viscosity of the liquid inside the discharging portion;

discharging a first amount of the liquid from the discharging portion;

acquiring second viscosity information related to viscosity of the liquid inside the discharging portion; and discharging a second amount of the liquid based on the first viscosity information and the second viscosity information, from the discharging portion, wherein the second amount is determined based on the first viscosity information, the second viscosity information, target viscosity information related to viscosity in a state in which the liquid inside the discharging portion is not thickened, on a difference value between the first viscosity information and the second viscosity information, a difference value between the second viscosity information and the target viscosity information, and the first amount, and wherein the first viscosity information is acquired after the maintenance process starts and before the first amount of the liquid is discharged from the discharging portion.

2. The maintenance method according to claim 1, wherein the second amount is determined by:

obtaining a first value by subtracting the target viscosity information from the second viscosity information, obtaining a second value by subtracting the second viscosity information from the first viscosity information, obtaining the second amount by multiplying the first amount by a value obtained by dividing the first value by the second value.

3. The maintenance method according to claim 1, wherein the second amount is determined by:

obtaining a first value by subtracting the target viscosity information from the second viscosity information, obtaining a second value by subtracting the second viscosity information from the first viscosity information, obtaining a third amount by multiplying the first amount by a value obtained by dividing the first value by the second value;

determining the third amount as the second amount when the third amount is less than a specific maximum discharging amount; and determining the specific maximum discharging amount as the second amount when the third amount is equal to or greater than the specific maximum discharging amount.

4. The maintenance method according to claim 3, wherein the first amount is less than the specific maximum discharging amount.

5. The maintenance method according to claim 4, wherein
a head unit, which is provided with the discharging portion, includes a temperature sensor, and
the maintenance method further comprises:
acquiring a measurement result by the temperature sensor; and
setting the target viscosity information based on the acquired measurement result.

6. The maintenance method according to claim 4, wherein the first amount is less than a volume of a flow path of the discharging portion.

7. The maintenance method according to claim 4, further comprising:
acquiring a third viscosity information related to viscosity of the liquid inside the discharging portion after the second amount of the liquid is discharged from the discharging portion; and
determining whether or not to discharge the liquid from the discharging portion based on the third viscosity information.

8. The maintenance method according to claim 4, wherein
the discharging portion is provided with a piezoelectric element that is displaced when a drive signal is supplied, a pressure chamber in which an internal pressure is increased or decreased when the piezoelectric element is displaced, and a nozzle that communicates with the pressure chamber and discharges the liquid, and
the first viscosity information and the second viscosity information are information based on residual vibration generated in the discharging portion after the drive signal is supplied to the piezoelectric element.

9. The maintenance method according to claim 3, wherein
the discharging portion is provided with a nozzle that discharges the liquid,
the liquid discharging apparatus includes a cap configured to cover the nozzle, and
the specific maximum discharging amount is set according to a length of a period during which a state in which the nozzle is covered by the cap is maintained.

10. The maintenance method according to claim 9, wherein
a head unit, which is provided with the discharging portion, includes a temperature sensor, and
the maintenance method further comprises:
acquiring a measurement result by the temperature sensor; and
setting the target viscosity information based on the acquired measurement result.

11. The maintenance method according to claim 9, wherein
the first amount is less than a volume of a flow path of the discharging portion.

12. The maintenance method according to claim 9, further comprising:
acquiring a third viscosity information related to viscosity of the liquid inside the discharging portion after the second amount of the liquid is discharged from the discharging portion; and
determining whether or not to discharge the liquid from the discharging portion based on the third viscosity information.

13. The maintenance method according to claim 9, wherein
the discharging portion is provided with a piezoelectric element that is displaced when a drive signal is supplied, a pressure chamber in which an internal pressure is increased or decreased when the piezoelectric element is displaced, and a nozzle that communicates with the pressure chamber and discharges the liquid, and
the first viscosity information and the second viscosity information are information based on residual vibration generated in the discharging portion after the drive signal is supplied to the piezoelectric element.

14. The maintenance method according to claim 1, wherein
a head unit, which is provided with the discharging portion, includes a temperature sensor, and
the maintenance method further comprises:
acquiring a measurement result by the temperature sensor; and
setting the target viscosity information based on the acquired measurement result.

15. The maintenance method according to claim 1, wherein
the first amount is less than a volume of a flow path of the discharging portion.

16. The maintenance method according to claim 1, further comprising:
acquiring a third viscosity information related to viscosity of the liquid inside the discharging portion after the second amount of the liquid is discharged from the discharging portion; and
determining whether or not to discharge the liquid from the discharging portion based on the third viscosity information.

17. The maintenance method according to claim 1, wherein
the discharging portion is provided with a piezoelectric element that is displaced when a drive signal is supplied, a pressure chamber in which an internal pressure is increased or decreased when the piezoelectric element is displaced, and a nozzle that communicates with the pressure chamber and discharges the liquid, and
the first viscosity information and the second viscosity information are information based on residual vibration generated in the discharging portion after the drive signal is supplied to the piezoelectric element.

* * * * *